United States Patent [19]
Fujimura et al.

[11] Patent Number: 5,364,048
[45] Date of Patent: Nov. 15, 1994

[54] SEAT BELT RETRACTOR

[75] Inventors: Yoshiichi Fujimura, Shiga; Shizutaka Matsuura, Hikone, both of Japan

[73] Assignee: Takata Corporation, Tokyo, Japan

[21] Appl. No.: 40,099

[22] Filed: Mar. 30, 1993

[30] Foreign Application Priority Data

Apr. 6, 1992 [JP] Japan .................. 4-082582

[51] Int. Cl.$^5$ .................. B60R 22/38; B60R 22/42
[52] U.S. Cl. .................. 242/381.1; 242/384.2
[58] Field of Search .................. 242/107.2, 107.4 A, 242/107.4 B; 280/806; 297/478, 480

[56] References Cited

U.S. PATENT DOCUMENTS

| | | | |
|---|---|---|---|
| 4,422,594 | 12/1983 | Honl | 242/107.4 B X |
| 4,619,419 | 10/1986 | Essler | 242/107.4 B X |
| 4,802,634 | 2/1989 | Singer | 242/107.4 B X |
| 5,115,990 | 5/1992 | Hanna et al. | 242/107.2 |
| 5,144,368 | 10/1992 | Fujimura et al. | 242/107.2 |
| 5,232,178 | 8/1993 | Hirata et al. | 242/107.4 B X |

FOREIGN PATENT DOCUMENTS

| | | |
|---|---|---|
| 3510673 | 9/1986 | Germany . |
| 2235862 | 3/1991 | United Kingdom . |
| 2240706 | 9/1991 | United Kingdom . |
| 2246507 | 2/1992 | United Kingdom . |

*Primary Examiner*—John M. Jillions
*Attorney, Agent, or Firm*—Varndell Legal Group

[57] ABSTRACT

In the seat belt retractor of the invention, the main pawl 17 turns into engagement with the teeth 23a of the lock ring 23, so that the rotational force of the reel shaft in the webbing unwinding direction is transmitted to the lock ring 23 to turn it in the same direction. This rotation of the lock ring 23 is transmitted to the clamp member 26 through the arm 24 to turn the clamp member 26. As a result, the webbing 3 is fastened between the clamp member 26 and the force-bearing member 27, so that the webbing 3 can be locked against further unwinding. This makes it possible to incorporate clamp means to even a frame lock type of seat belt retractor, and improves the reliability of part engagement much more.

3 Claims, 31 Drawing Sheets

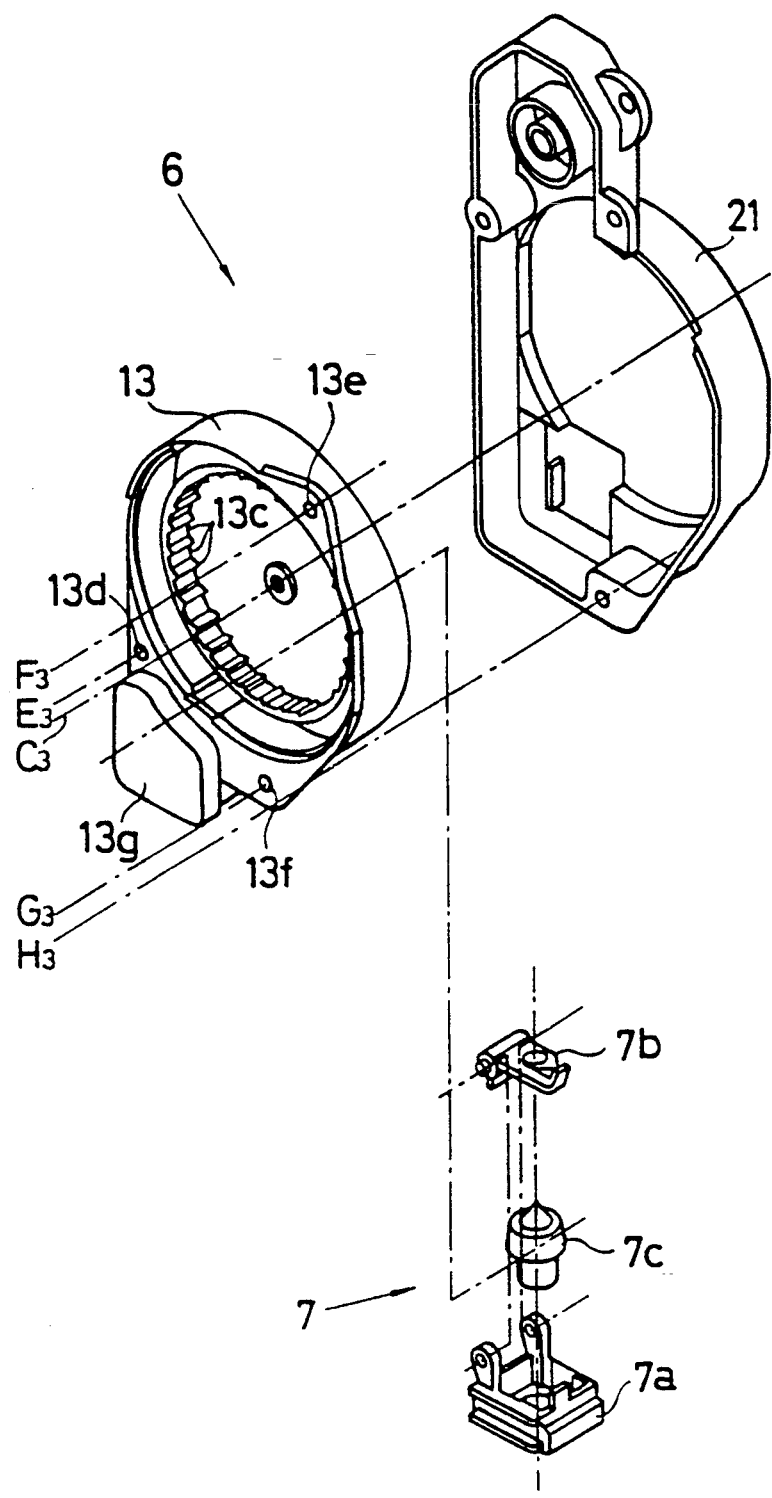

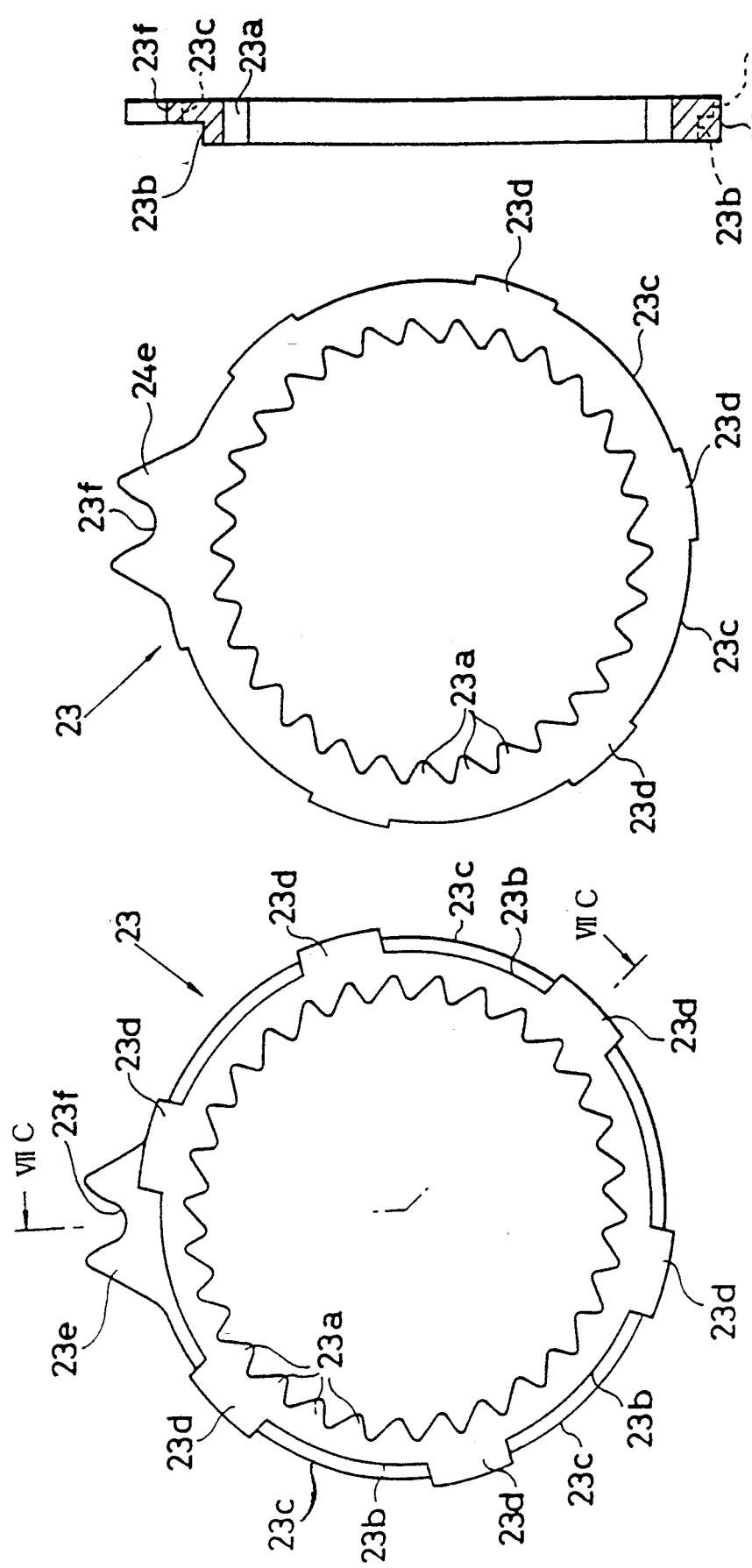

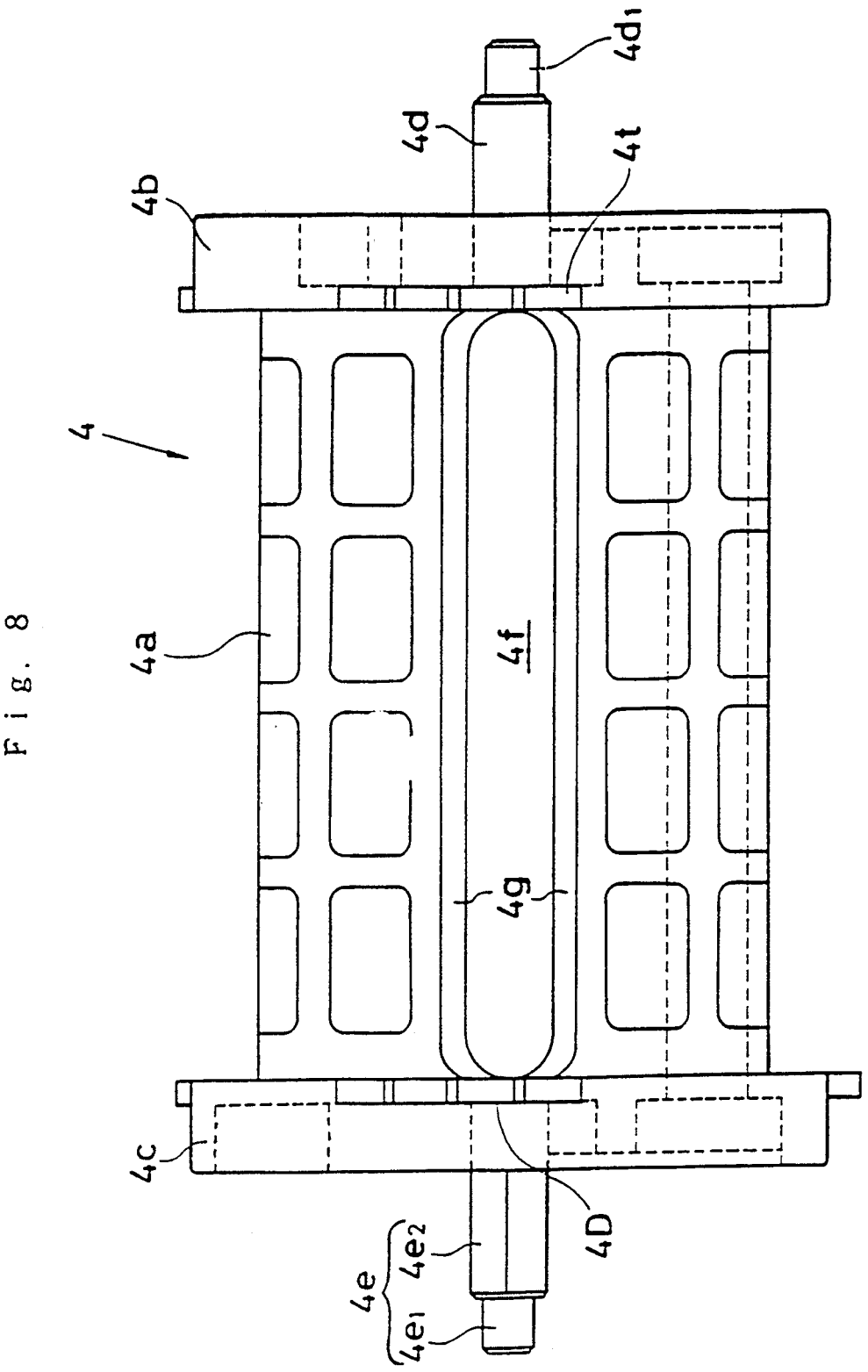

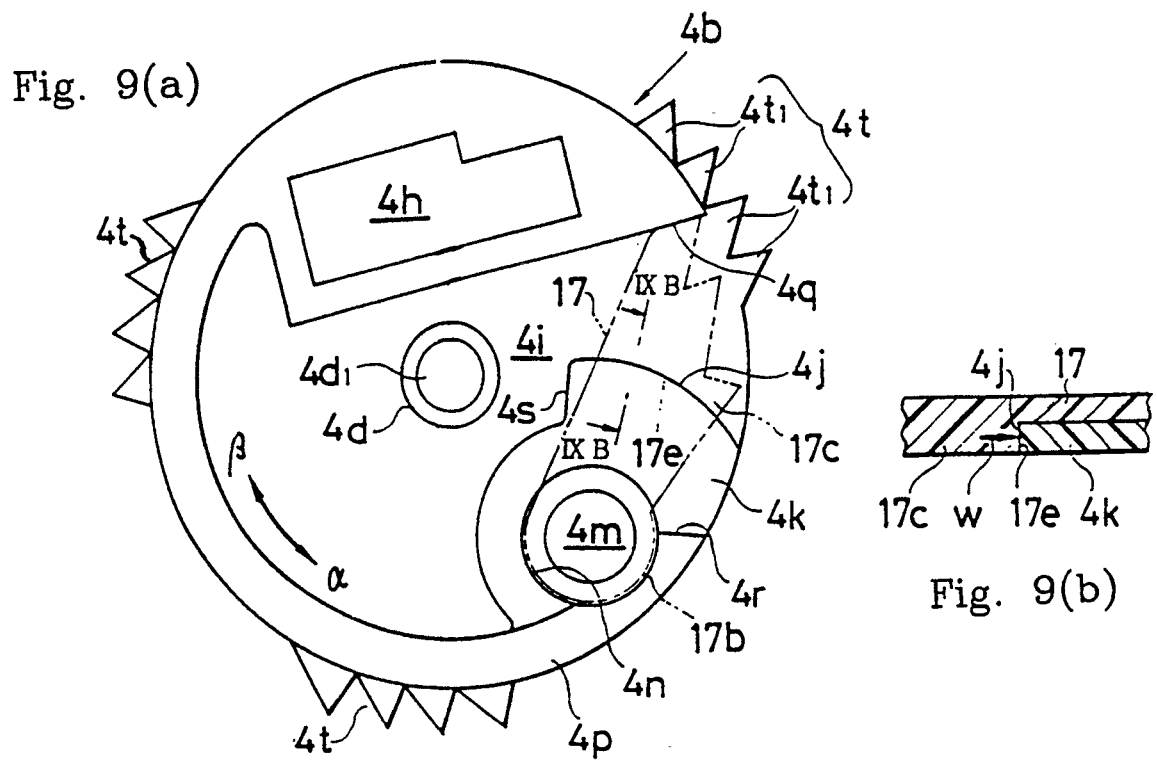
Fig. 9(a)
Fig. 9(b)
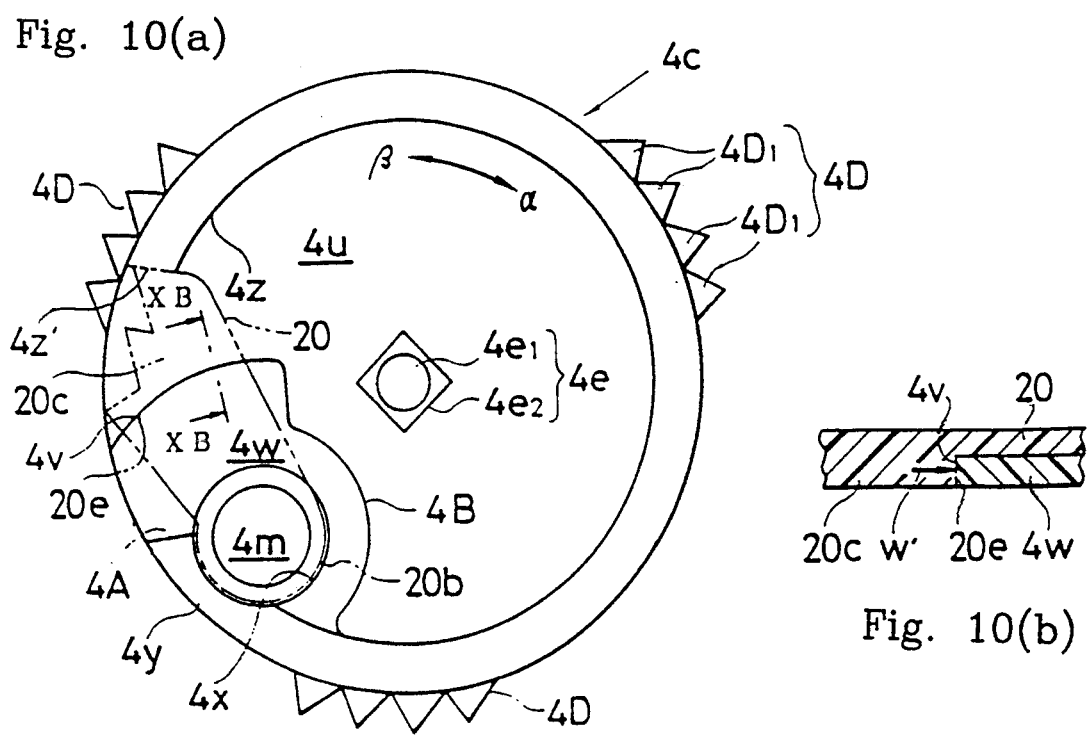
Fig. 10(a)
Fig. 10(b)

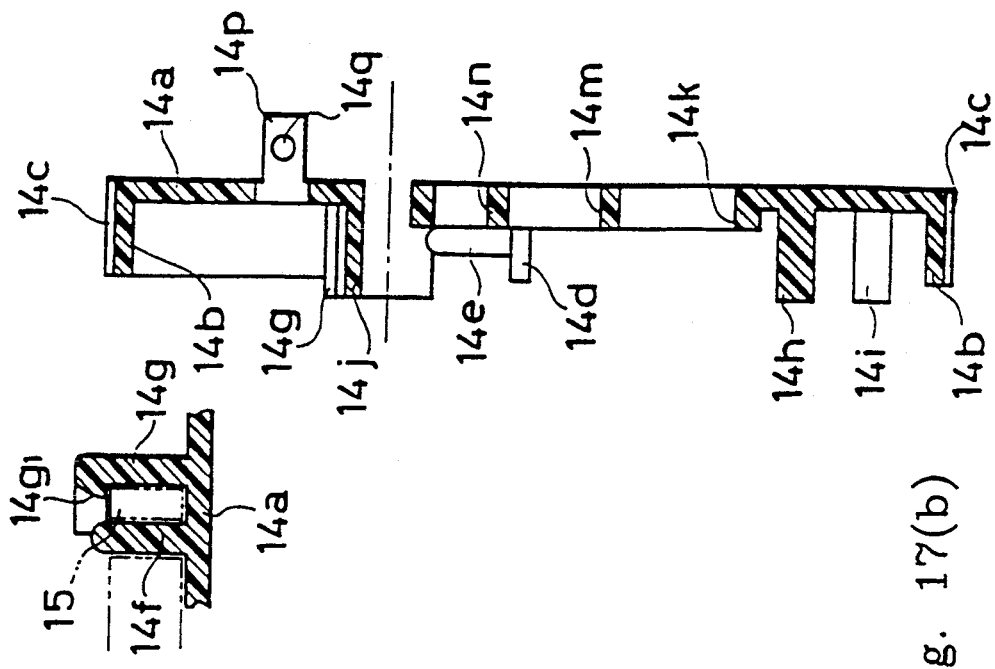
Fig. 17(c)
Fig. 17(b)
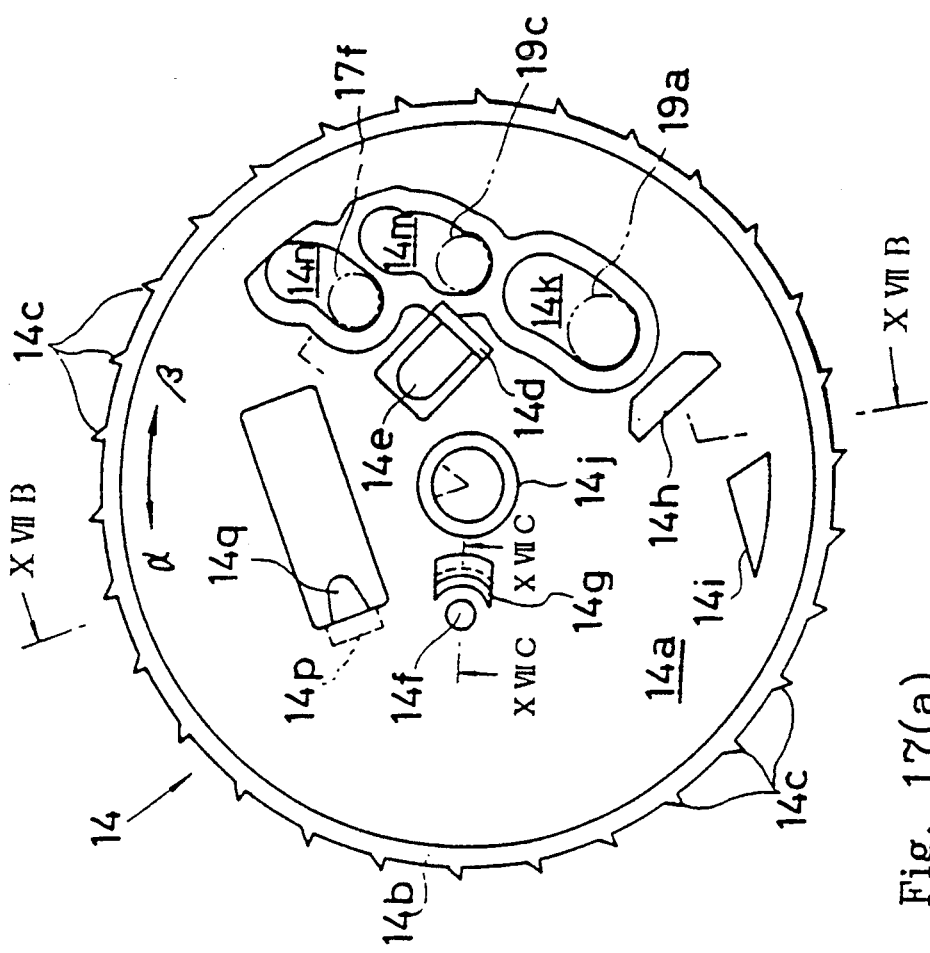
Fig. 17(a)

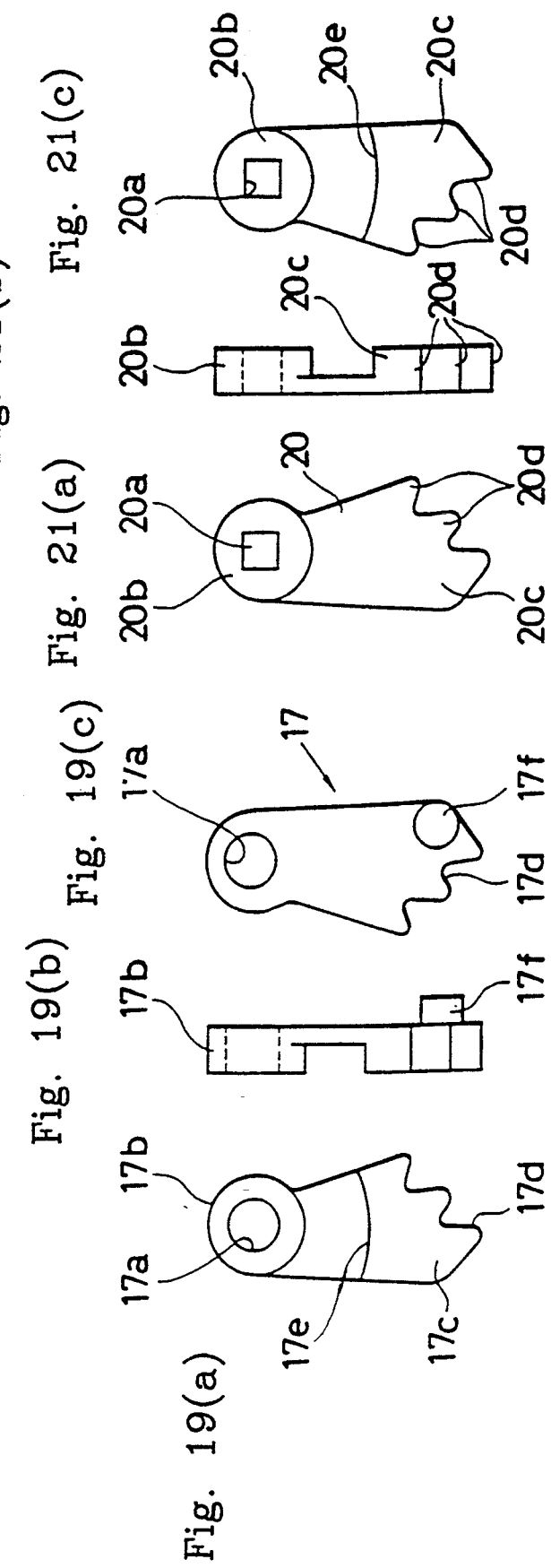

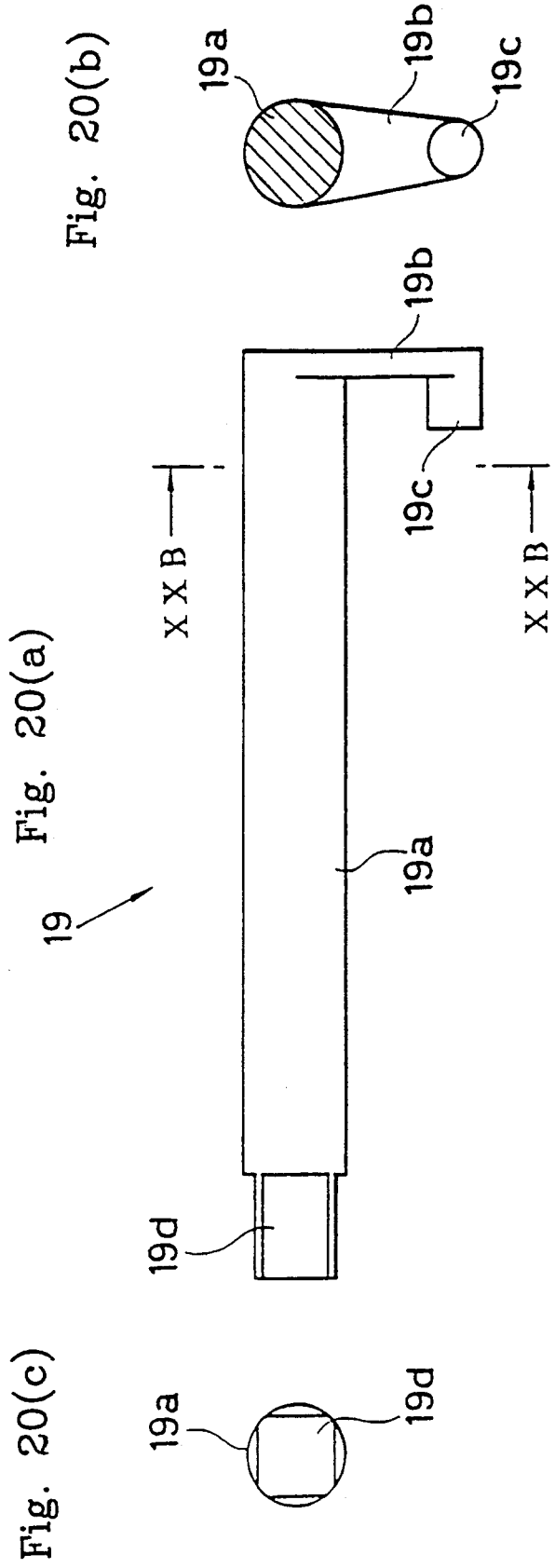

Fig. 26(a)
Fig. 26(b)
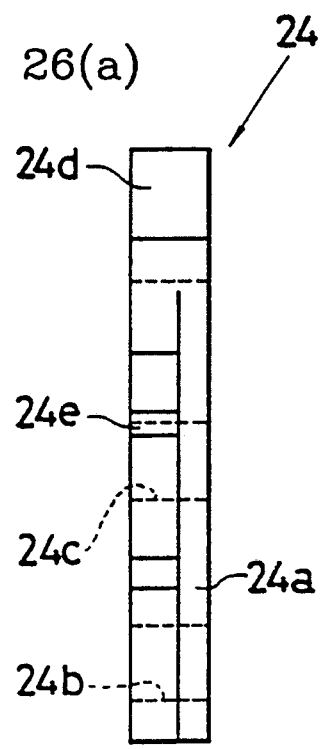
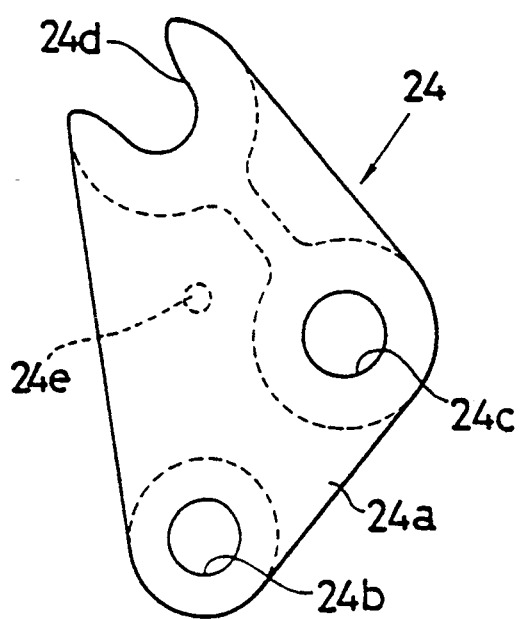
Fig. 27
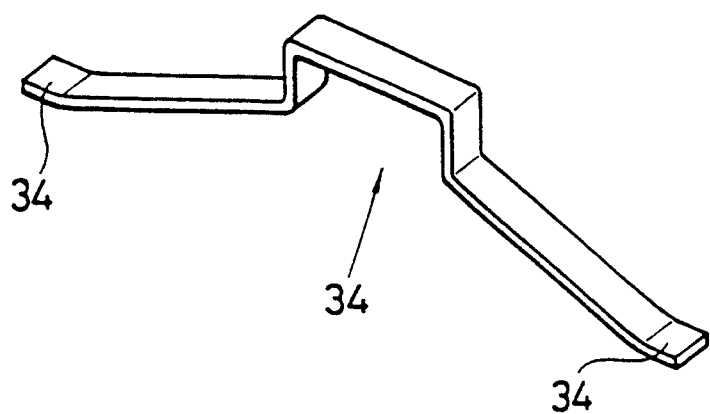

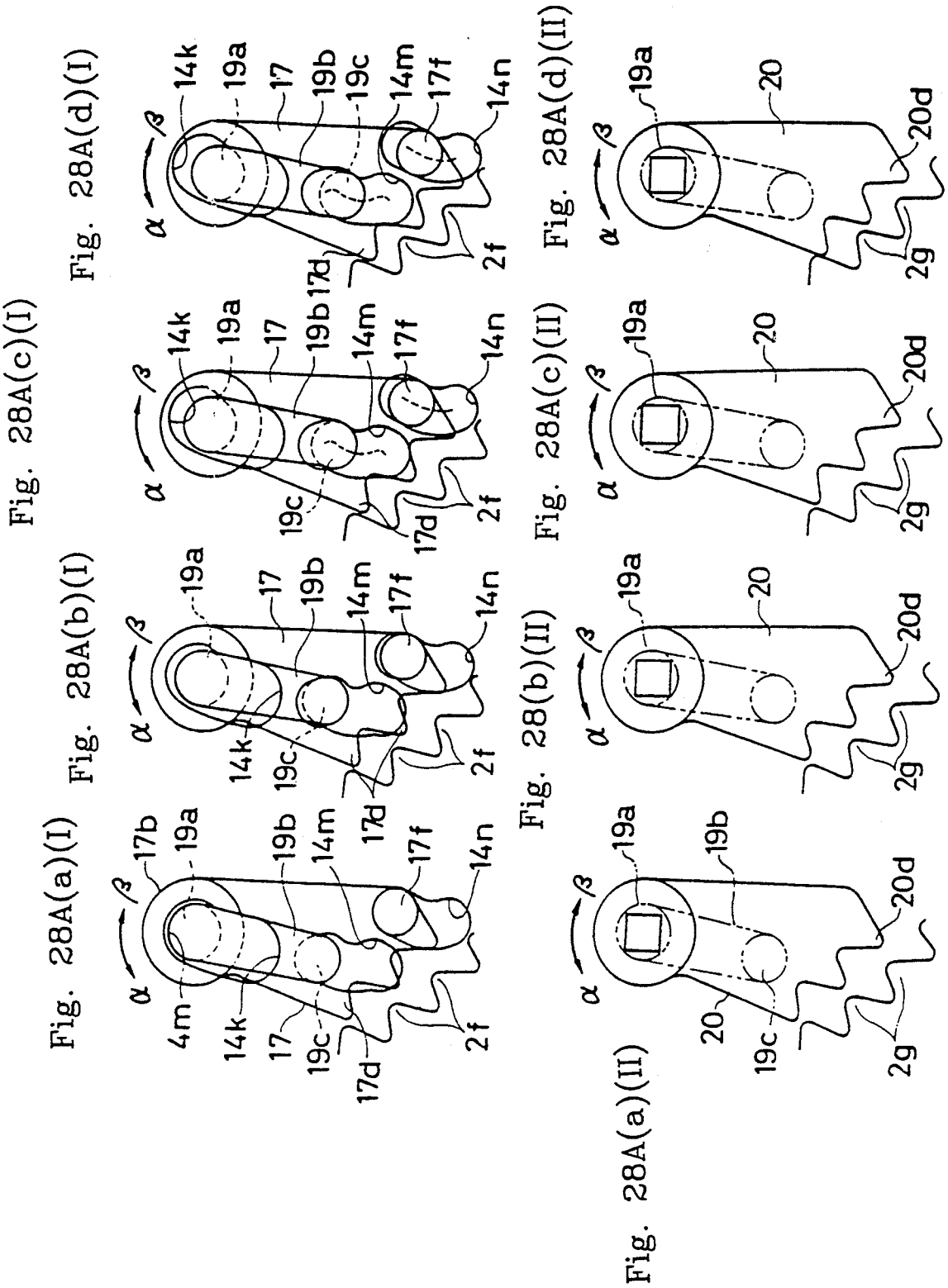

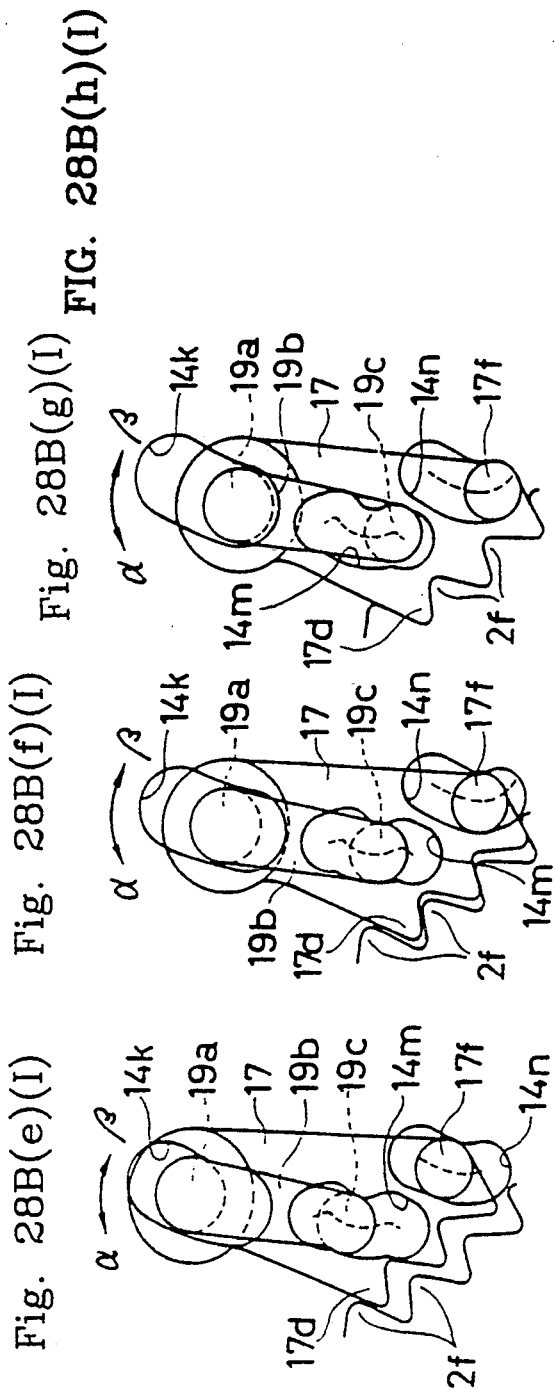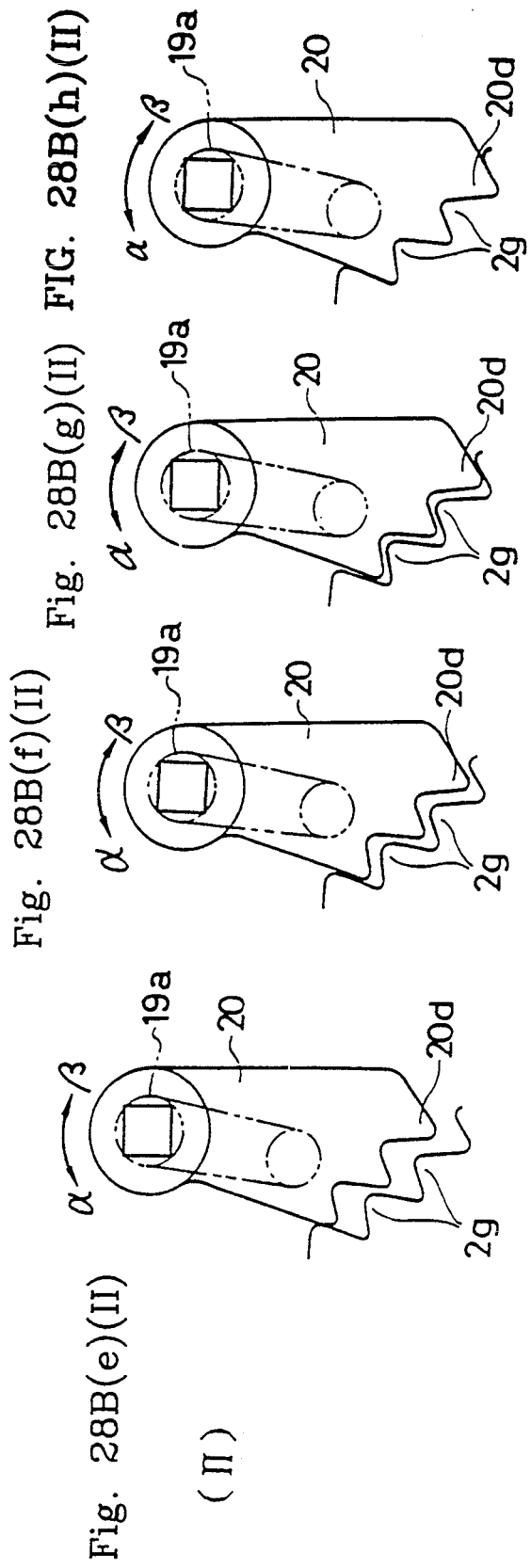

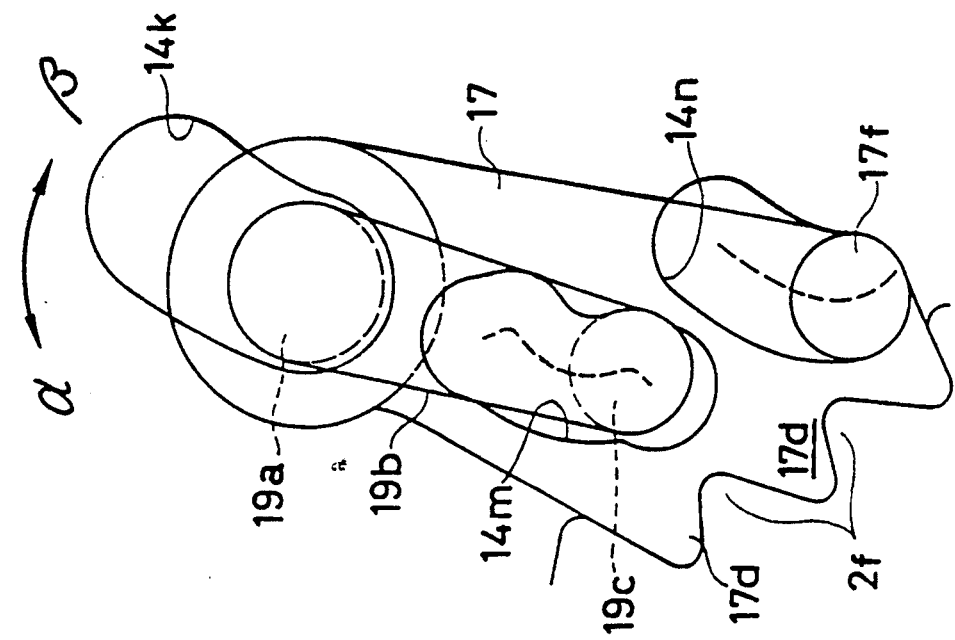
Fig. 29(b) Lock position
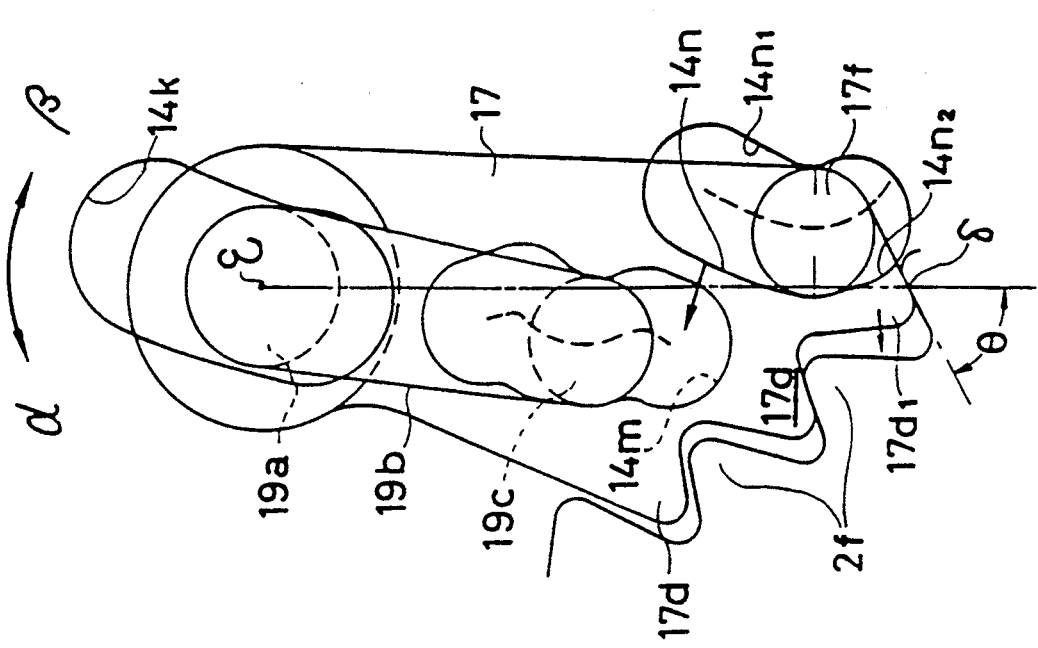
Fig. 29(a) Standby position

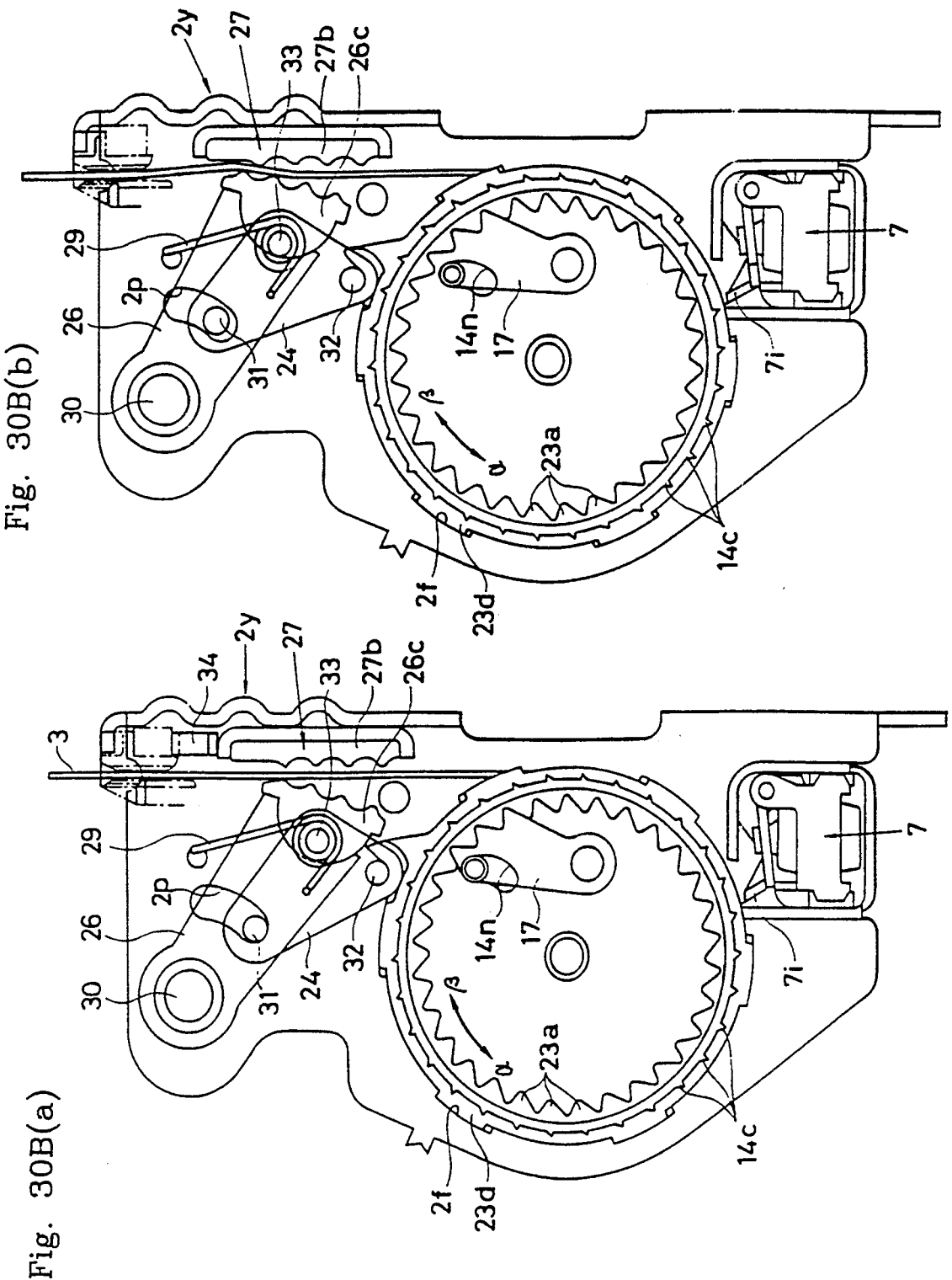

SEAT BELT RETRACTOR

BACKGROUND OF THE INVENTION

The present invention relates generally to a seat belt retractor assembly incorporated in an automobile or other vehicle for securing the occupant(s) and, more particularly, to a seat belt retractor that locks the reel shaft, which winds the webbing on it in the event of an emergency, against rotation, thereby preventing the webbing from being unwound.

A conventional seat belt retractor incorporated in an automobile or other vehicle is provided with lock means for locking a reel shaft, which winds a webbing on it, against rotation in the event of an emergency such as when the car is excessively decelerated, thereby preventing the webbing from being unwound due to the inertial motion of the occupant.

One typical example of the lock means for such a reel shaft is set forth and illustrated in the specification and drawings of U.S. Pat. No. 4,796,918. This is called a frame lock type of lock means, including a reel shaft and teeth provided on a frame that supports the reel shaft. Upon deceleration larger than a predetermined value applied to a vehicle, the reel shaft is moved until its teeth mesh with the teeth of the frame, thereby locking the reel shaft against further rotation. This frame lock type of lock means can be relatively reduced in weight, because it is possible to dispense with any special member because of forming teeth on the frame. Accordingly, this lock means may well accommodate to weight reductions which current vehicles such as automobiles must achieve.

As mentioned above, further unreeling of the webbing may be avoided by locking the reel shaft against further rotation upon excessive deceleration applied to a vehicle. In some cases, however, excessive webbing wound on the reel shaft is tightly wound up by unwinding force on the webbing, and this tight winding-up tends to unreel the webbing further.

As disclosed in JP-A-03-112750, there is thus proposed another seat belt retractor that is designed to lock a reel shaft against rotation and clamping a webbing by clamp means to lock up the webbing, thereby preventing the webbing from being further unreeled.

In the seat belt retractor disclosed in this publication, a pawl is engaged with teeth of a ratchet wheel formed on the reel shaft, thereby locking the reel shaft against rotation, and some operable member is used to actuate the clamp means in operable association with the motion of this pawl, thereby locking up the webbing.

In a retractor including such lock means as disclosed in the specification and drawings of the above U.S. patent, the teeth formed on the reel shaft mesh with the teeth of the frame. Therefore, when the reel shaft is locked against rotation, relatively large forces are applied to the teeth of the reel shaft and the teeth of the frame. It is thus required to increase the widths of these teeth so as to relieve stress exerted thereon. So far, the stress exerted on the teeth has been relieved by increasing the thicknesses of the teeth of the reel shaft and the frame, thereby increasing the width of engagement, or by forming separate teeth on the frame for reinforcement. However, a weight-increase problem arises in the former case. In the latter case, not only are more parts needed because some reinforcement must be used, but more steps are needed because of an additional step of reinforcement attachment, thus incurring some considerable expense.

In the case of the frame lock type of lock means mentioned above, it is required that the teeth formed at both ends of the reel shaft mesh simultaneously with the teeth formed on both sides of the frame. However, some considerable difficulty is indeed experienced in achieving simultaneous engagement on both sides; such engagement often takes place on one side. It is particularly difficult to achieve simultaneous engagement on both sides, because the reel shaft is moved to engage the teeth on the reel shaft side with the teeth on the frame side. Where the teeth are engaged with each other on one side alone, stress concentrates on those teeth, resulting in need of further strength increases, and this leads inevitably to size and weight increases in retractors.

In order to prevent the webbing from being unreeled due to its tight winding-up, it is desired to incorporate such webbing clamp means as disclosed in JP-A-03-112750 in such a frame lock type of seat belt retractor.

However, it is difficult to apply the clamp means disclosed in this publication, without any modification thereto, to the above-mentioned frame lock type of seat belt retractor that is designed to move the reel shaft until the teeth on the reel shaft side mesh with the teeth on the frame side. This is because this clamp means is actuated by engaging the engaging claw of the second operable member with the teeth of the ratchet wheel formed on the reel shaft to transmit the rotational force of the ratchet wheel from the second operable member to the clamp means through the first operable member.

This clamp means is much more complicated in structure due to using a much more increased number of parts and combining such parts. This is because it must be constructed from the pawl for locking up the reel shaft, the second operable member for taking the rotational force of the reel shaft, the first operable member for transmitting such rotational force from the second operable member to the clamp means, and the operable member for associating the motion of the pawl with the motion of the second operable member.

SUMMARY OF THE INVENTION

An object of the invention is to enable clamp means for webbing locking to be incorporated in a frame lock type of seat belt retractor and thereby provide a seat belt retractor that is more improved in terms of part engagement, is much reduced in terms of the number of parts and the number of assembling steps, and is light in weight, inexpensive, and simplified in structure.

According to the invention, this object is achieved by the provision of a seat belt retractor including a reel shaft for winding a webbing on it, a frame for rotatably supporting both ends of said reel shaft, lock means that is located between said frame and said reel shaft, and permits the rotation of said reel shaft in the normal state and is actuated, as occasion demands, to lock said reel shaft against at least its rotation in the webbing unwinding direction, deceleration sensor means that is actuated when deceleration larger than a predetermined value is applied to a vehicle, lock actuator means that turns in synchronism with the rotation of said reel shaft in the normal state, and rotates relative to said reel shaft in operable association with the actuation of said declaration sensor means, thereby actuating said lock means, clamp means for locking up said webbing, and an operable members that operates in operable association with the actuation of said lock means to actuate said clamp means, characterized in that:

said lock means including a lock ring having a first portion to be engaged, said first portion being provided at one end of said reel shaft of said frame and designed to be rotatable by a given amount; a first engaging member having a first engaging portion that is rotatably supported at one end by one end of said reel shaft and can be engaged at the other end with said first portion to be engaged, said first engaging portion being designed such that, in the normal state, it is held at a position where it is not engaged with said first portion to be engaged and, as occasion demands, it turns to a position where it is engaged with said first portion to be engaged; a second portion to be engaged, that is provided at the other end of said reel shaft of said reel shaft; and a second engaging member having a second engaging portion hat is rotatably supported at one end by the other end of said reel shaft and can be engaged at the other end with said second portion to be engaged, said second engaging portion being designed such that, in the normal state, it is held at a position where it is not engaged with said second portion tic be engaged and, as occasion demands, it turns to a position where it is engaged with said second portion to be engaged, said clamp means including a clamp member for having clamping force on said webbing and a member for bearing the clamping force of said clamp member, said webbing being clamped between said clamp member and said force bearing member under the clamping force of said clamp member, thereby locking up said webbing, and said operable member comprising an arm that is engaged with said lock ring and said clamp member, thereby transmitting the rotational force of said reel shaft transmitted to said lock ring to said clamp member.

In another aspect of the invention, it is characterized in that said first engaging portion is formed on the inner circumference of said lock ring; the outer circumference of said lock ring is slidably fitted into a circular hole formed in said frame; one of a recess and a projection is formed on the inner circumference of said circular hole; the other of a recess and a projection is formed on the outer circumference of said circular hole; the circumferential length of said recess is longer than that of said projection by a given amount; and said lock ring is located in said circular hole to allow said projection to be disposed in said recess.

In a further aspect of the invention, it is characterized in that said clamp member includes a lever comprising a toggle link mechanism and a toothed member provided at the end of said lever and having a given number of teeth, said arm being interposed between said lock ring and said lever, and said clamp member is constructed such that, after the said lever is turned by said arm in the locking direction to allow said teeth to bite into said webbing, said lever is allowed to turn in the locking direction only by unwinding force on said webbing, thereby locking up said webbing automatically.

In the seat belt retractor of the invention constructed as mentioned above, as the first engaging portion of the first engaging member is turned into engagement with the first portion to be engaged of the lock ring, the rotational force of the reel shaft in the webbing unwinding direction is transmitted to the lock ring, thereby turning the lock ring in the same direction. This turning of the lock ring is then transmitted to the clamp member through the arm to turn the clamp member, whereby the webbing is fastened between the clamp member and the force-bearing member to lock up the webbing. Thus, the webbing is locked against further unwinding.

Due to insufficient clamping force between the clamp member and the force-bearing member or for other reasons, the webbing often tends to be further unwound. In this case, however, the reel shaft is further rotated, so that its rotational force can be transmitted to the lock ring by way of the first engaging member, thereby giving rise to further turning of the lock ring in the same direction. As the total amount of rotation of the lock ring from its initial position reaches a preset amount, the turning of the lock ring is stopped to lock up the reel shaft. Thus, the unwinding of the webbing is positively prevented.

In the seat belt retractor of the invention, the first engaging member has the functions of locking the reel shaft against rotation and transmitting the rotational force of the reel shaft to the clamp member by way of the arm. Thus, there is a reduction in the number of the parts forming the transmission mechanism for transmitting the rotational force of the reel shaft to the clamp member in operable association with the movement of the first engaging member, and any cam hole for controlling the parts of the transmission mechanism formed on the lock ring is dispensed with. Hence, the structure of the transmission mechanism is not only much more simplified, but it is also easy to machine the lock ring, resulting in the achievement of a light and inexpensive seat belt retractor.

In particular, the lock ring can be turned smoothly and stably according to the invention, because the outer circumference of the lock ring is slidable while it is guided by the inner circumference of the circular hole in the frame.

Further, the rotational force of the reel shaft is transmitted by the arm that is the operable member to the clamp member until the clamp member exerts its self-locking action. However, with the clamp member exerting its self-locking action, the rotational force of the reel shaft is no longer transmitted by the arm to the clamp member. This makes it possible to form the arm of light material, resulting in the achievement of a much lighter seat belt retractor.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 1C is a perspective exploded view that shows the right-hand portion of one embodiment of the seat belt retractor according to the invention, FIGS. 7(a), 7(b) and 7(c) represents the lock ring used in this embodiment FIG. 7(a) being a left side view, FIG. 7(b) a right side view, and FIG. 7(c) a sectional view taken along the line VIIC—VIIC of FIG. 7(a), FIG. 8 is a front view of the reel shaft used in this embodiment, FIGS. 9(a) and 9(b) represent the reel shaft used in this embodiment, FIG. 9(a) being a right side view, and FIG. 9(b) a sectional view taken along the line IXB—IXB of FIG. 9(a), FIGS. 10(a) and 10(b) represent the reel shaft used in this embodiment, FIG. 10(a) being a left side view, and FIG. 10(b) a sectional view taken along the line XB—XB of FIG. 10 (a)

DESCRIPTION OF THE PREFERRED EMBODIMENTS

Figure 1A:
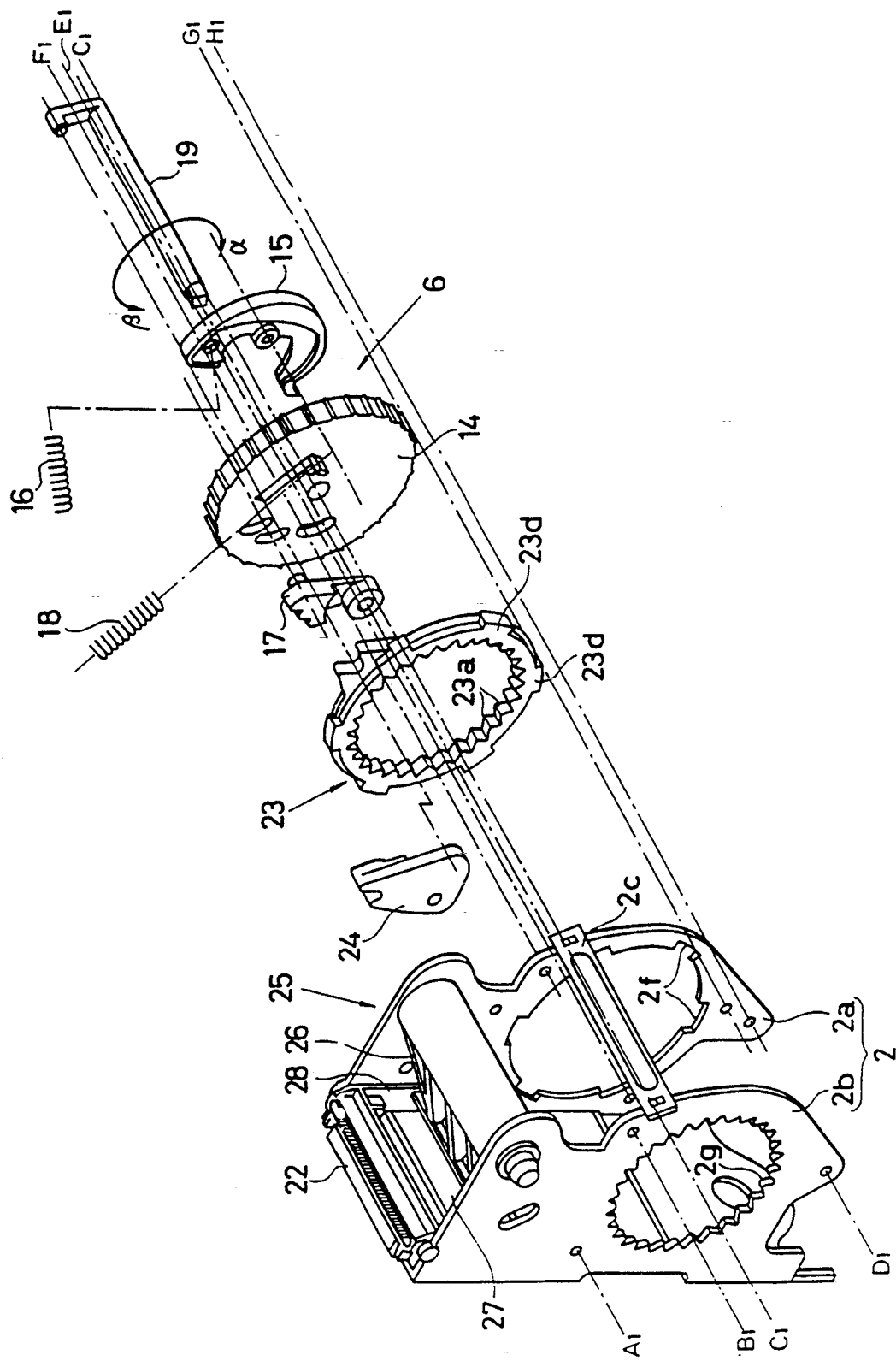
FIG. 1A is a perspective exploded view that shows the central portion of one embodiment of the seat belt retractor according to the invention.
Figure 1B:
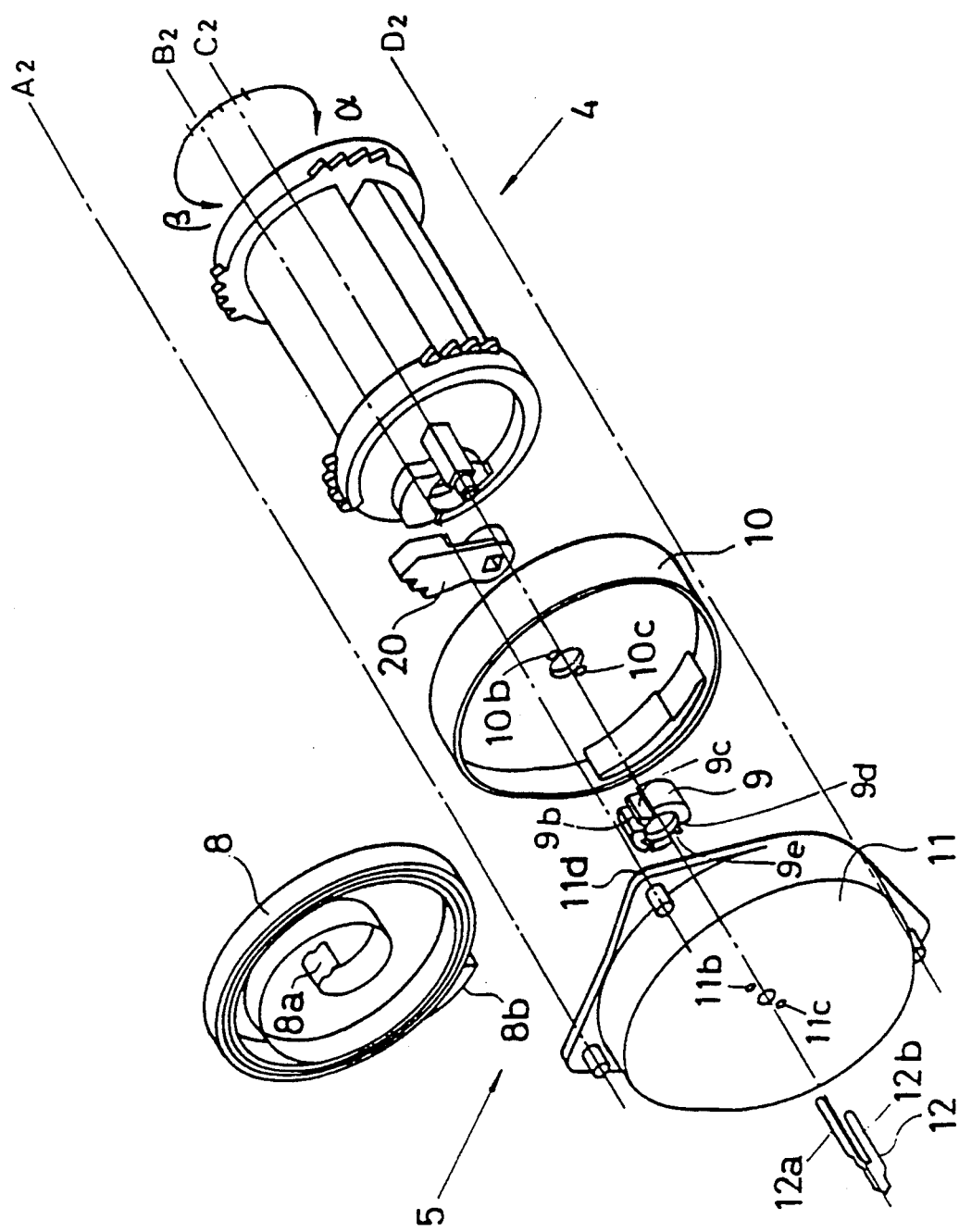
FIG. 1B is a perspective exploded view that shows the left-hand portion of one embodiment of the seat belt retractor according to the invention.
Figure 2:
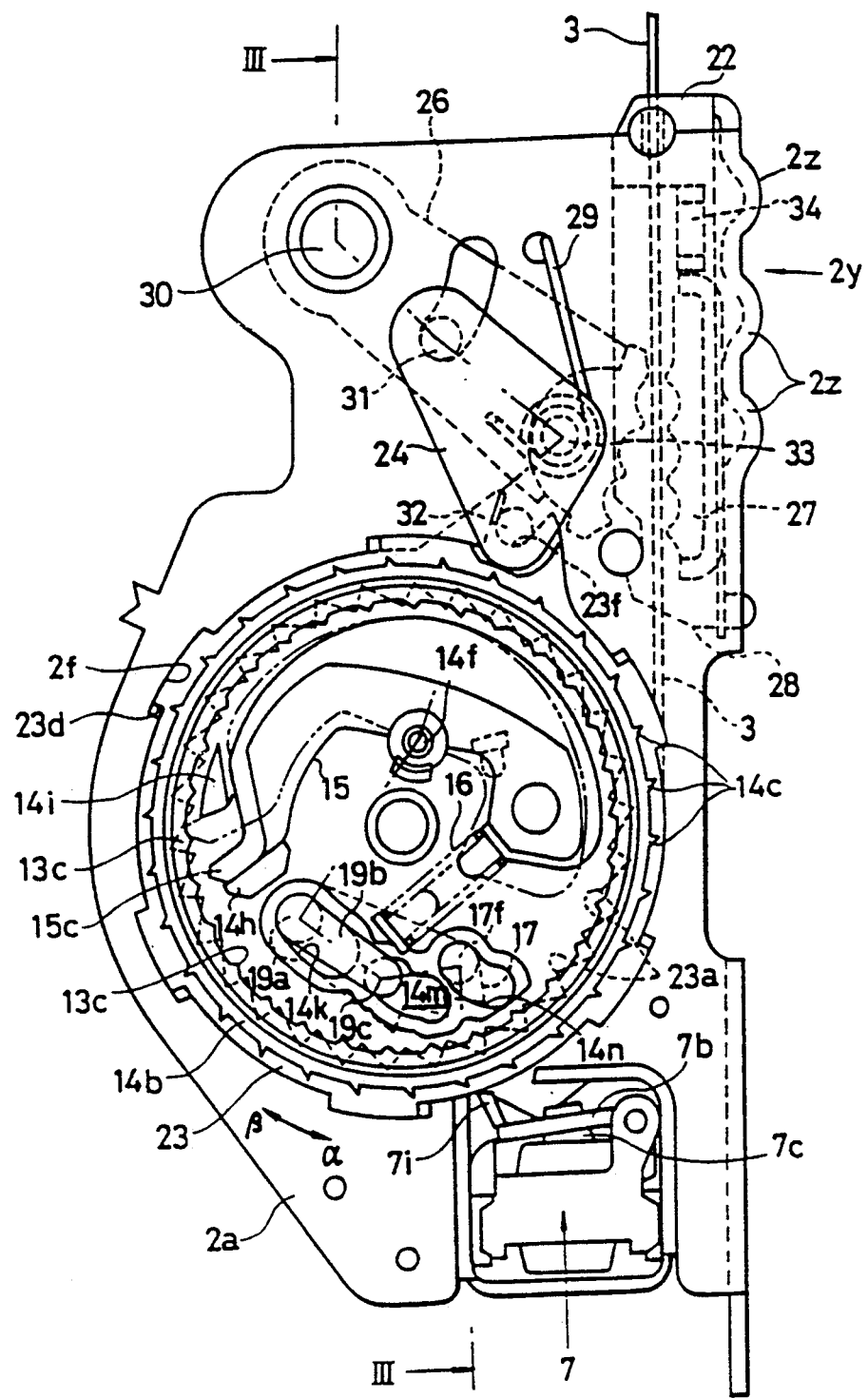
FIG. 2 is a left side view of the seat belt retractor of this embodiment that is an illustration of the full-assembled seat retractor, from which the cover is removed.
Figure 3:
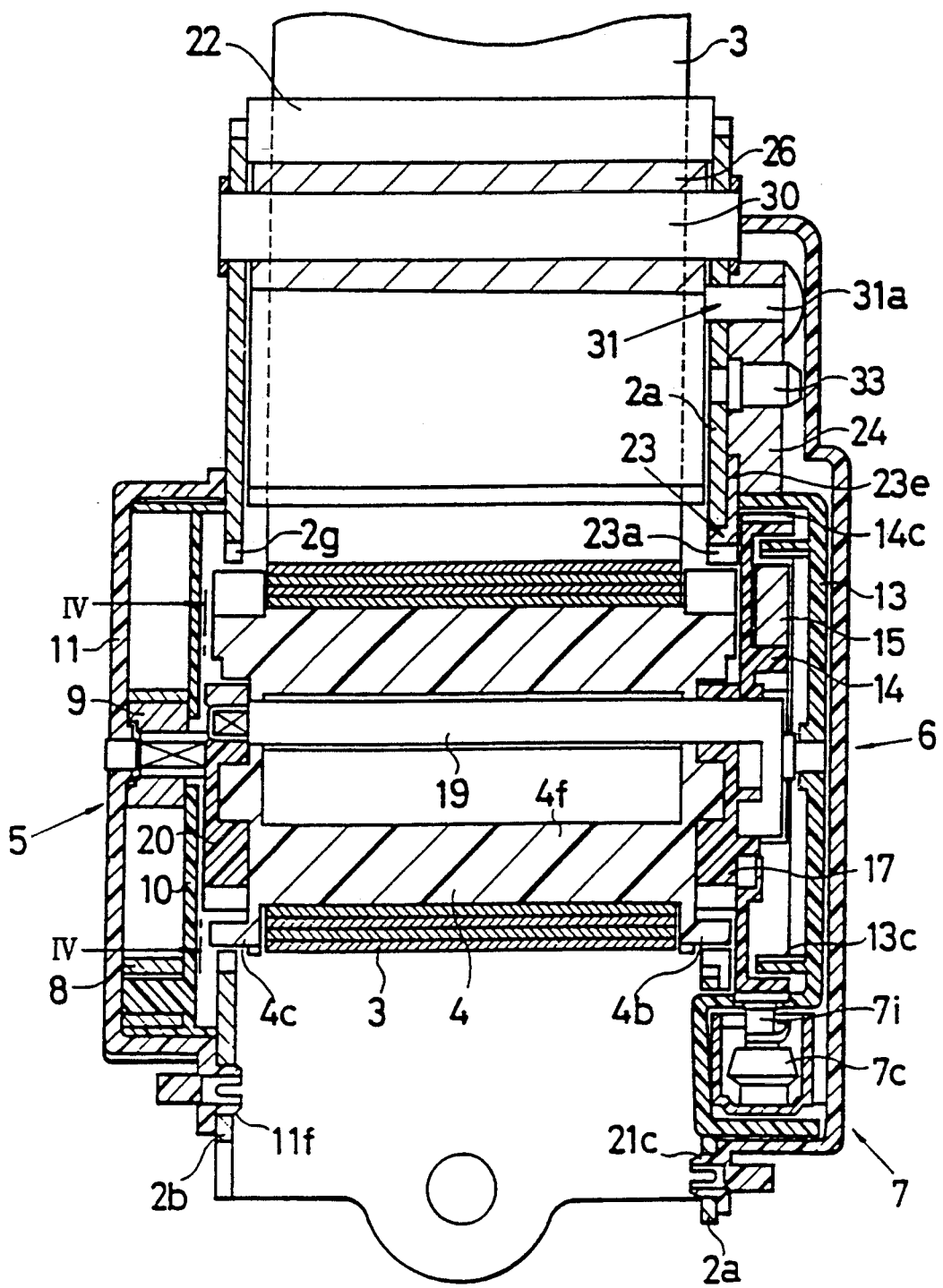
FIG. 3 is a sectional view taken along the line III—III of FIG. 2, showing the seat belt retractor that is in its full-assembled state.
Figure 4:
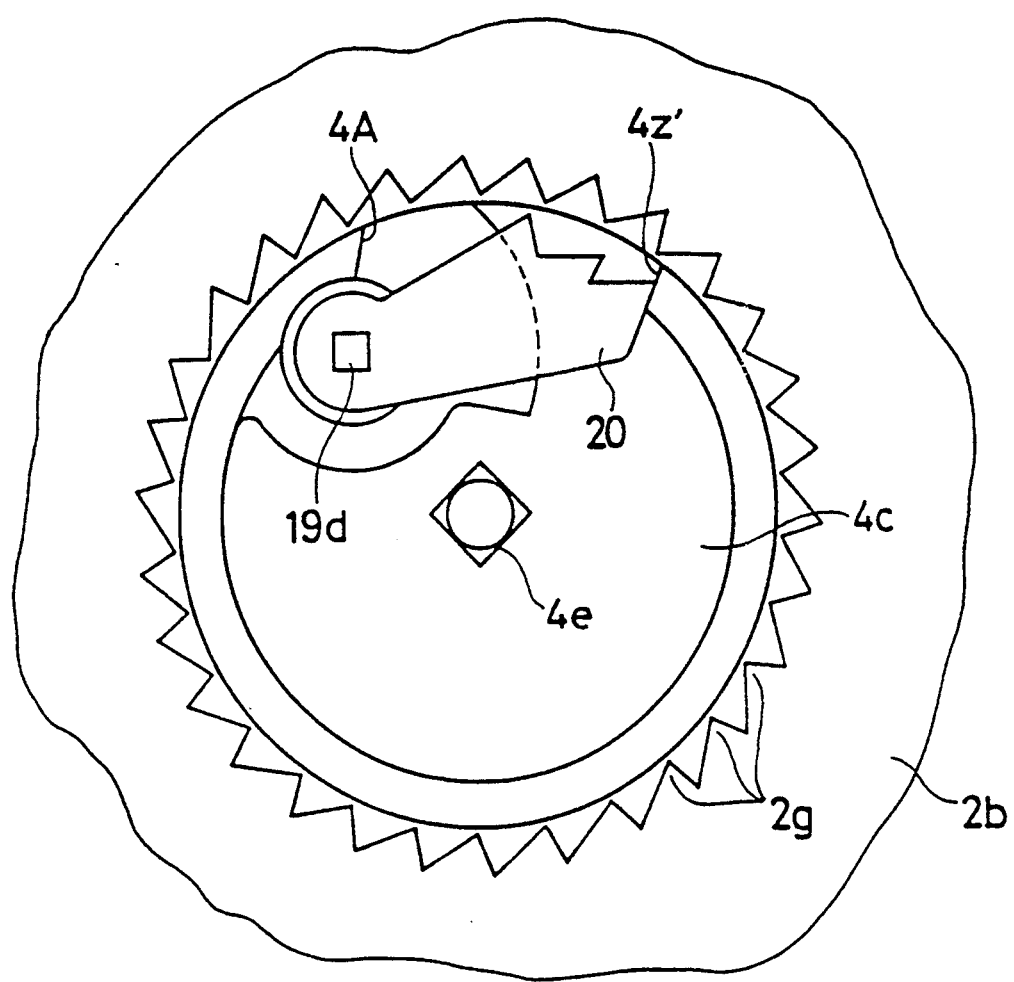
FIG. 4 is a sectional view taken along the line IV—IV of FIG. 3, showing the seat belt retractor that is in its full-assembled state.

FIGS. 1A, 1B and 1C are perspective exploded representations of one embodiment of the sheet belt retractor according to the invention, FIG. 1A illustrating the central part thereof, FIG. 1B the left-hand side thereof, and FIG. 1C the left hand side thereof. This perspective exploded view is completed by aligning lines $A_1$, $B_1$, $C_1$ and $D_1$ of FIG. 1A with lines $A_2$, $B_2$, $C_2$ and $D_2$ of FIG. 1B and lines $F_1$, $E_1$, $C_1$, $G_1$ and $H_1$ of FIG. 1A with lines $F_3$, $E_3$, $C_3$, $G_3$ and $H_3$ of FIG. 1C. FIGS. 2 to 4 are representations of the sheet belt retractor according to the instant embodiment that is in its full-assembled state, FIG. 2 being a right side view of the sheet belt retractor from which the cover is removed, FIG. 3 a sectional view taken along the line III—III of FIG. 2, and FIG. 4 a partial right section of the arrangement of FIG. 3 from which biasing force applicator means 5 is removed.

Figure 5:
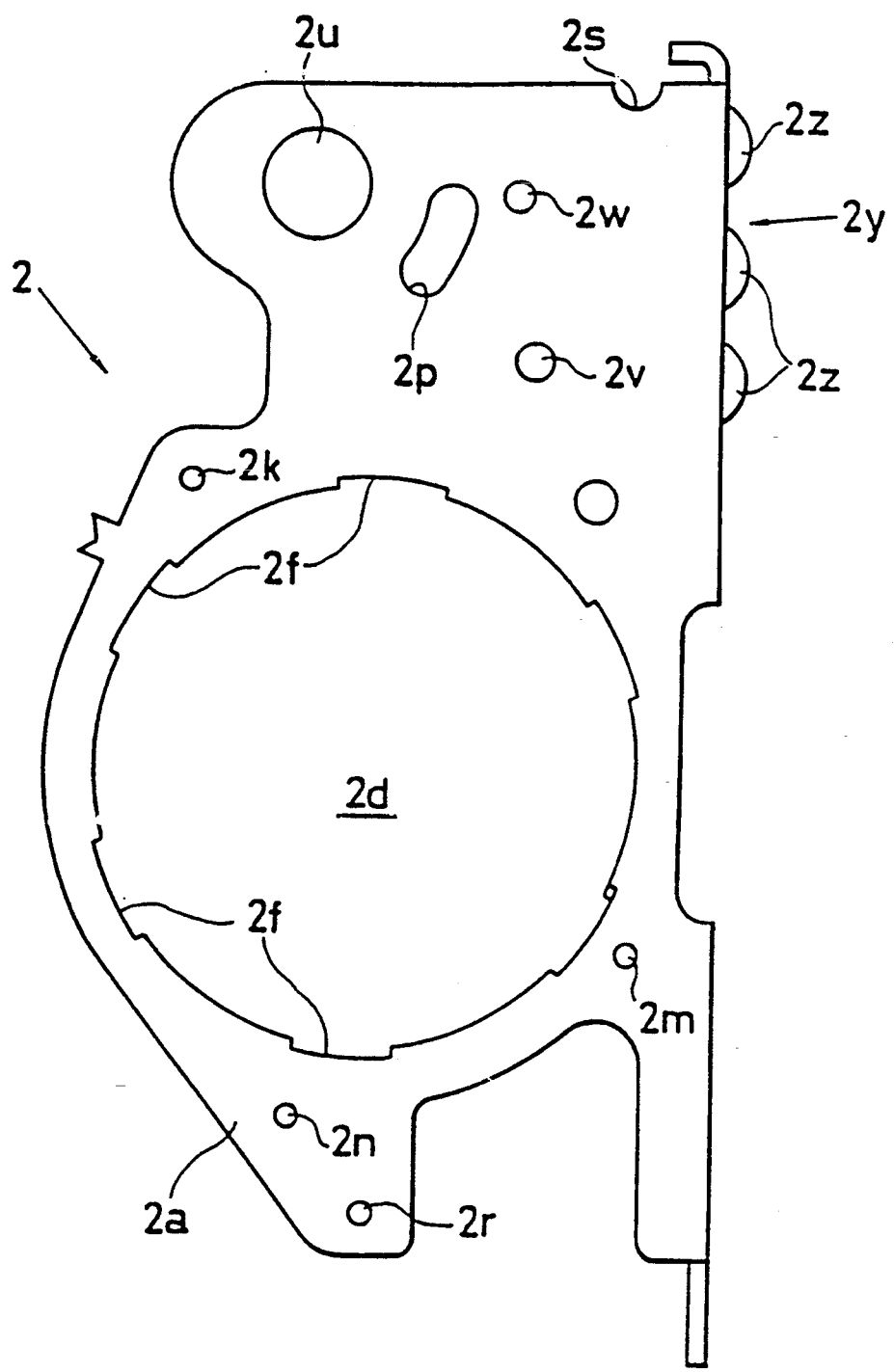
FIG. 5 is a right side view of the frame used in this embodiment.

As can be seen from FIGS. 1A to 4, the sheet belt retractor, shown generally at 1, according to this embodiment includes a C-shaped frame 2 having right and left side walls 2a and 2b. These right and left side walls 2a and 2b are interconnected with each other for the purpose of reinforcing the frame 2. As can be best seen from FIG. 5, the right side wall 2a is provided with a circular hole 2d, which is provided with six dents 2f around the entire inner circumference at almost equal intervals. In addition, the right side wall 2a is provided with four engaging holes 2k, 2m, 2n and 2r, an arcuate guide hole 2p, an arcuate groove 2s for supporting the shaft of a webbing guide 22 to be described later, a hole 2u through which a lever pin 30 (see FIG. 3) for pivotally supporting a clamp member of clamp means 25 to be described later is passed, a hole 2v through which there is fixedly passed a lever screw 31 that acts as a pivotal shaft of an arm 24 to be described later and supports a torsion spring 29 that is biased in one direction, and a hole 2w in which one end of the torsion spring 29 is engaged.

Figure 6:
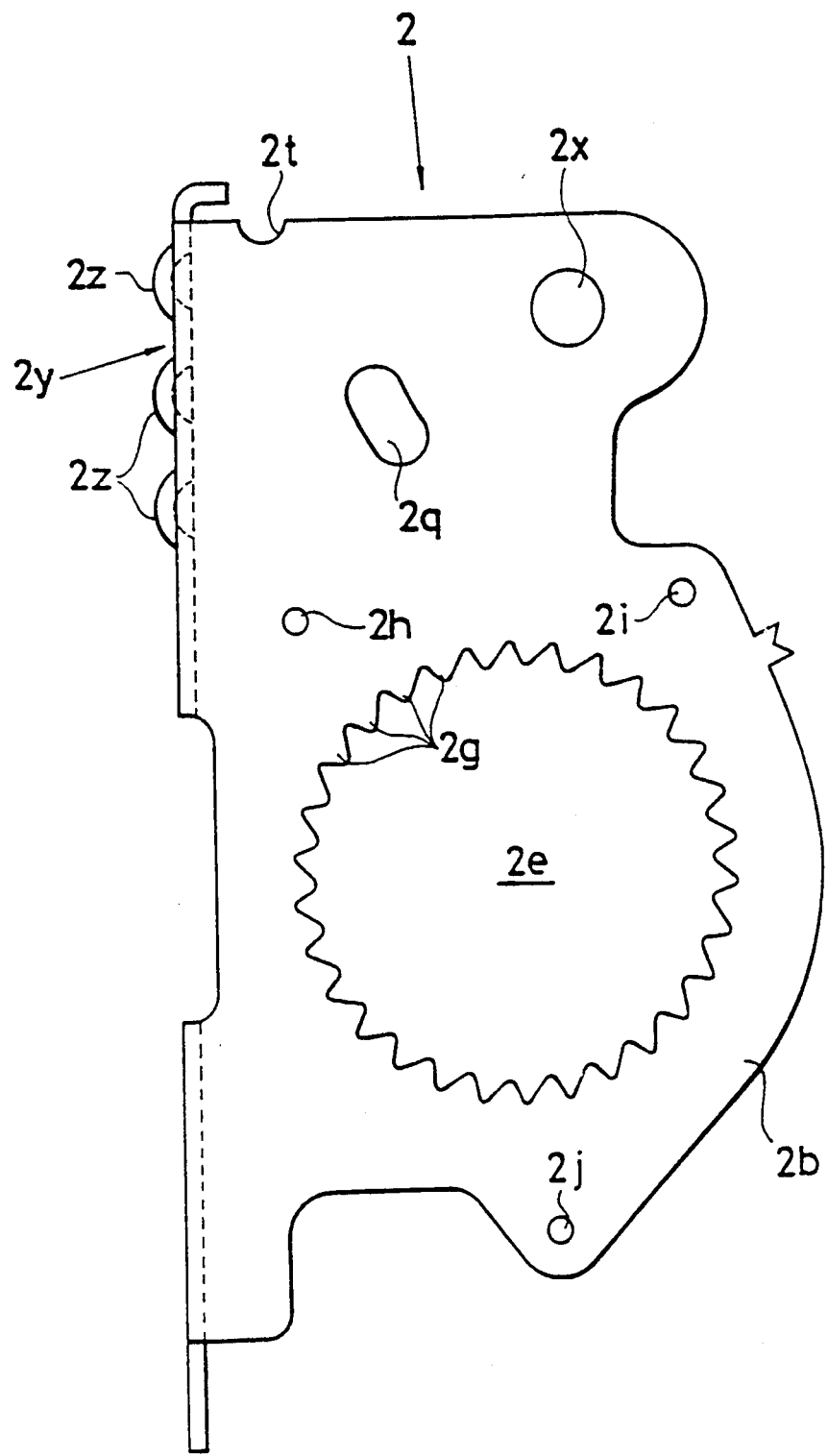
FIG. 6 is a light side view of the frame used in this embodiment.

As can be best seen from FIG. 6, on the other hand, the left side wall 2b is provided with a circular hole 2e, and this hole 2e is provided with a given number of angular teeth 2g on the entire inner circumference. Each tooth 2g inclines relatively steeply on one side located in the webbing-applicator unwinding direction and relatively gently on the other side located in the webbing-winding direction $\beta$. In addition, the left side wall 2b is provided with three engaging holes 2h, 2i and 2j, a circular guide hole 2q, an arcuate groove 2t for the supporting the shaft of the webbing guide 22 to be described later, and a hole 2x for rotatably supporting the swivel shaft of the clamp member 25.

A backup pawl 20 can be engaged with the teeth 2g on the left side wall 2b, said backup pawl 20 coupled to one end of a joint pin 19 to be described later, which is pivotally supported at one end in a fifth recess 4x formed in a flanged portion 4c of a reel shaft 4 and acts at the other end as an engaging portion located in a fourth recess 4u. As can be best appreciated from FIG. 21, the backup pawl 20 is in a fan form, the pivot of which is provided with a boss 20b having a through-hole 20a of a rectangular shape in section. At the end of the backup pawl 20 opposite to the pivot, there is formed a claw portion 20c. At the distal end of the claw 20c there are provided teeth 20d that can mesh with the teeth 2g of the left side wall 2b of the frame 2. How to mount this backup pawl 20, and so on, will be described at great length.

A part of the outer circumference of a lock ring 23 is almost closely and rotatably fitted in the hole 2d in the right side wall 2a. As shown in FIGS. 7(a) to 7(c), this lock ring 23 is provided with a predetermined number of angular teeth 23a on the entire inner circumference. Each tooth 23a inclines relatively steeply on the side in the webbing-unwinding direction and relatively gently on the other side in the webbing-winding direction $\beta$.

As can be seen from FIG. 7(c), the outer circumference of the lock ring 23 differ in diameter on the left and right sides, and is stepped in section. In other words, the left-side outer circumference 23b has a smaller diameter, whereas the right-side circumference 23c has a larger diameter. The diameter of the left-side outer circumference 23b is almost equal to or slightly smaller than the diameter of the hole 2d in the right side wall 2a. In addition, these outer circumferences 23b and 23c are provided with six projections or pegs 23d at equal intervals in the circumferential direction. The circumferential lengths of these pegs 23d are shorter than the circumferential length of the dent 2f in the right side wall 2a by a given amount . Furthermore, the right-side outer circumference 23c is provided with a connection 23e that is connected to the arm 24 to be described later for relative rotation thereto. This connection 23e includes a groove 23f, in which a connecting pin 24a (shown in FIG. 25) provided on the arm 24 is fitted.

The left-hand outer circumference 23b of the thus constructed lock ring 23 is almost closely and turnably fitted in the hole 2d in the right side wall 2a. In this case, the six pegs 23d are located within the recesses 2f, and the circumference length of each recess 2f is longer than the circumference length of each peg 23d by a certain amount $\eta$; the lock ring 23 is rotatable with respect to the right side wall 2a by the angle of rotation defined by this amount $\eta$.

A main pawl 17 can mesh with the teeth 23a of this lock ring 23, said main pawl being rotatably supported at one end in a third recess 4n in a flange form of portion 4b of a reel shaft 4 to be described layer and located at the other end in a second recess 4i.

As can be best appreciated from FIGS. 19(a) to 19(c), the main pawl 17 is in a fan form, the pivot of which is provided with a boss 17b having a through-hole 17a. At the end of the main pawl 17 opposite to the pivot there is formed a claw portion 17c. At the distal end of the claw 17c there are provided teeth 17d capable of meshing with the teeth 23a of the lock ring 23 attached to the right side wall 2a of the frame 2. How to mount this main pawl 17, and so on, will be explained at great length.

The teeth 2g of the left side wall 2b, the teeth 23a of the lock ring 23, the main pawl 17 and the backup pawl 20 define lock means for locking the rotation of the reel shaft 4, mentioned just below, at least in the webbing unwinding direction.

As illustrated in FIG. 3, the reel shaft 4 for winding the webbing 3 on it is located between the left and right side walls 2a and 2b of the frame 2. As can be seen from FIG. 8, this reel shaft 4 is constructed from a central webbing take-up portion 4a, circular flanged portions 4b and 4c formed at both right and left ends of the take-up portion 4a for guiding the winding of the webbing 3, a first rotary shaft 4d that is located at the central portion of the flanged portion 4b and projects axially and outwardly, and a second rotary shaft 4e located at the central portion of the flanged portion 4c and coaxial with the first rotary shaft 4d. The webbing take-up portion 4a is provided with a diametrically extending throughhole 4f, in which the end of the webbing 3 is inserted and locked so as to enable the webbing 3 to be reeled in. This through-hole 4f is designed to have a larger width at one end; the through-hole 4f is formed into a hole stepped at 4g, at which the end of the webbing 3 is locked.

As illustrated in FIGS. 9(a) and 9(b), the right-hand flanged portion 4b is provided with a first recess 4h for receiving a pawl spring 18 (shown in FIG. 1A), a second recess 4i for receiving a claw portion 17c of a main pawl 17 (the details of which are shown in FIG. 19 to be referred to later), a load-bearing portion 4k having a load-bearing surface 4j adapted to bear load applied to the claw portion 17c of the main pawl 17, an axial through-hole 4m in which the joint pin 19 is loosely and rotatably fitted, and a third recess 4n that is formed at the end of the through-hole 4m and coaxial with the through-hole 4m. The first, second and third recesses 4h, 4i and 4n have the largest axial depths with respect to the surface of an outer peripheral edge 4p of the flanged portion 4b, and the surface of the load-receiving portion 4k has a smaller axial depth with respect to the surface of the outer peripheral edge 4p than the recesses 4h, 4i and 4n. Accordingly, steps 4q, 4r and 4s are respectively defined between the second recess 4i and the portion of the outer peripheral edge 4p of the flanged portion 4b in which the first recess 4h is formed, between the outer peripheral edge 4p of the flanged portion 4b and the load-bearing portion 4k, and between the second recess 4i and the load-bearing portion 4k. The load-bearing surface 4j is formed by an arcuate segment that has a given length and is concentric with the through-hole 4m.

Further, the outer surface of the flanged portion 4b is equidistantly provided with three right-hand guide portions 4t in the circumferential direction so as to guide the reel shaft 4 axially with respect to the right side wall 2a, when the reel shaft 4 is located between the right and left side walls 2a and 2b. These right-hand guides 4t are of such sizes as not to permit them to pass easily through the holes 2d and 2e in the right and left side walls 2a and 2b. However, these right-hand guide 4t have each a given number of teeth $4t_1$ that are similar in shape and slightly smaller than the teeth 23a and 2g formed on the left and right side walls 2a and 2b. Accordingly, when the teeth 4t are in alignment with the teeth 23a or 2g, the flanged portion 4b having the right-hand guide $4t_1$ can pass through the holes 2d and 2e.

The first rotary shaft 4d has a portion of smaller diameter at the end, as shown at $4d_1$, and this portion $4d_1$ is rotatably fitted and supported in a small hole 13n in a first cover 13 for the lock gear, as will be described later.

As illustrated in FIGS. 10(a) and 10(b), the left-hand flanged portion 4c is provided with a fourth recess 4u in which the claw portion 20c of the backup pawl 20 (the details of which are shown in FIG. 21), a load-bearing portion 4w having a load-bearing surface 4v adapted to bear load applied to the claw portion 20c of the backup pawl 20, an axial through-hole 4m in which the joint pin 19 is loosely and rotatably fitted, and a fifth circular recess 4x that is formed at the end of the through-hole 4m and coaxial with the through-hole 4m. The fourth and fifth recesses 4u and 4x have the largest axial depths with respect to the surface of an outer peripheral edge 4y of the flanged portion 4c, and the surface of the load-bearing portion 4w has a smaller axial depth with respect to the surface of the outer peripheral edge 4y than the recesses 4u and 4x. Accordingly, steps 4z, 4A and 4B are respectively defined between the fourth recess 4u and the outer peripheral edge 4y of the flanged portion 4c, between the outer peripheral edge 4y of the flanged portion 4c and the load-bearing portion 4w, and between the fourth recess 4u and the load-bearing portion 4w. The load-bearing surface 4v is formed by an arcuate segment that has a given length and is concentric with the through-hole 4m.

Further, the outer surface of the flanged portion 4c is equidistantly provided with three right-hand guide portions 4D in the circumferential direction so as to guide the reel shaft 4 axially with respect to the left side wall 2b, when the reel shaft 4 is located between the right and left side walls 2a and 2b. These left-hand guides 4D are of such sizes so as not to permit them to pass easily through the holes 2d and 2e in the right and left side walls 2a and 2b. However, these right-hand guide 4D have each a given number of teeth $4D_1$ that are similar in shape to and slightly smaller than the teeth 23a and 2g formed on the left and right side walls 2a and 2b. Accordingly, when the teeth $4D_1$ are in alignment with the teeth 23a or 2g, the flanged portion 4c having the left-hand guide 4D can pass through the holes 2d and 2e.

The second rotary shaft 4e projecting axially from the flanged portion 4c has an end portion $4e_1$ of a circular shape in section and a root portion $4e_2$ of a rectangular shape (a square shape in the instant embodiment) in section.

As can be best seen from FIG. 8, not only does the through-hole 4m extend through the flanged portions 4b and 4c, but it extends axially through the central webbing take-up portion 4a; that is, the through-hole 4m extends axially through the reel shaft 4.

As illustrated in FIGS. 1B and FIG. 3, on the left side wall 2b there is mounted a biasing force applicator means 5 that furnishes the reel shaft 4 with force for reeling the webbing 3 on it. In addition, on the right side wall 2a there is mounted a seat belt lock actuator means 6, as shown in FIGS. 1A, 1C and 3. Also, there is mounted a deceleration sensor means 7 that, when sensing a given vehicle deceleration, is actuated to put the seat belt lock actuator 6 in operation, as shown in FIGS. 1C and 3.

As shown in FIG. 1B, the biasing force applicator 5 is constructed from a power spring 8 made up of a spiral spring, a bush 9 to which an inner end 8a of the power spring 8 is connected to apply spring force thereto, a spring case 10 to which an outer end 8b of the power spring 8 is fixed and in which the pawl spring 8 is housed, and a cover 11 which is attached to the spring case 10 to cover the power spring 8.

Figure 11:
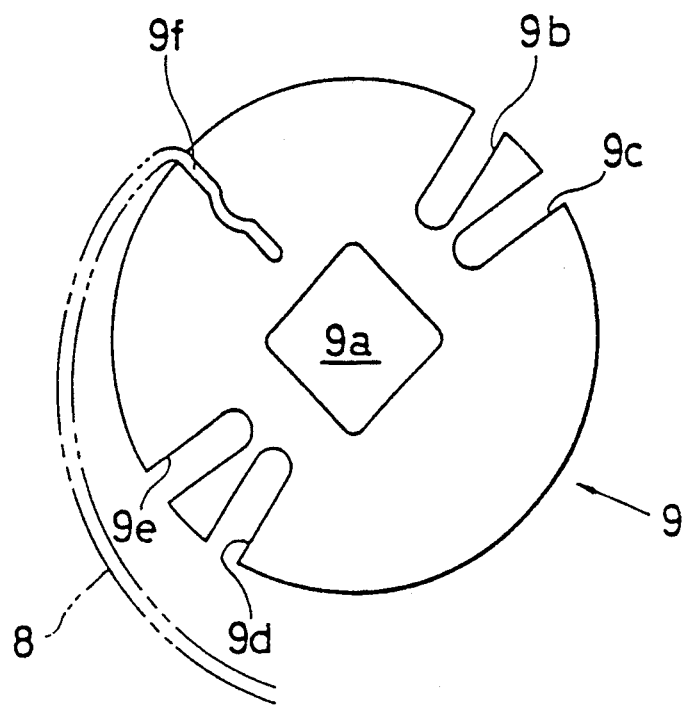
FIG. 11 is a left side view of the bush used in this embodiment, FIGS. (12(a) and 12(b) represent the spring case used in this embodiment, FIG. 12(a) being a right side view, and FIG. 12(b) a sectional view taken along the line XIIB—XIIB, FIGS. 13(a) and 13(b) represent the cover used in this embodiment, FIG. 13(a) being a left side view, and FIG. 13(b) a sectional view taken along the line XIIIB—XIIIB, FIG. 14 represents the spring pin used in this embodiment, FIG. 15 is a left side view of the first cover for the lock gear used in this embodiment, FIG. 16 is a right side view of the first cover for the lock gear used in this embodiment, FIGS. 17(a) and 17(b) and 17(c) represent the lock gear used in this embodiment, FIG. 17(a) being a right side view, FIG. 17(b) a sectional view taken along the line XVIIB—XVIIB of FIG. 17(a), and FIG. 17(c) a sectional view taken along the line XVIIC—XVIIC of FIG. 17(a), FIGS. 18(a) and 18(b) represent the inertia device used in this embodiment, FIG. 18(a) being a left side view, and FIG. 18(b) a sectional view taken along the line XVIIIB—XVIIIB of FIG. 18(a), FIGS. 19(a), 19(b) and 19(c) represent the main pawl used in this embodiment, FIG. 19(a) being a left side view, FIG. 19(b) a front view, and FIG. 19(c) a right side view, FIGS. 20(a), 20(b) and 20(c) represent the joint pin used in this embodiment, FIG. 20(a) being a front view, FIG. 20(b) a sectional view taken along the line XXB—XXB of FIG. 20(a), and FIG. 20(c) a left side view, FIGS. 21(a), 21(b) and 21(c) represent the backup pawl used in this embodiment, FIG. 21(a) being a left side view, FIG. 21(b) a front view, and FIG. 21(c) a right side view, FIG. 22 is a partially cut-away view showing the deceleration sensor means used in this embodiment, FIGS. 23(a) and 23(b) represent the case, lever, and engaging claw of the deceleration sensor means, FIG. 23(a) being a front view, and FIG. (b) a partially cut-away right side view, FIGS. 24(a), 24(b) and 24(c) represent the inertia device of this deceleration sensor means, FIG. 24(a) being a plan view, FIG. 24(b) a partially cut-away front view, and FIG. 24(c) a bottom view, FIGS. 25(a) and 25(b) represent the clamp means used in this embodiment, FIG. 25(a) a perspective of the clamp member, and FIG. 25(b) a perspective view of the force-bearing member, FIGS. 26(a) and 26(b) illustrate the arm used in this embodiment, FIG. 26(a) being a front view, and FIG. 26(b) a left side view, FIG. 27 is a perspective view of the holder spring used in this embodiment, FIGS. 28A(II)(a) through 28A(i)(d) and FIGS. 28A-(II)(a) through 28(II)(d) are illustrations of a part of the operation of the main and backup pawls used in this embodiment, FIGS. 28B(I)(e) through 28B(I)(h) and FIGS. 28B(II)(e) through 28B(II)(h) are illustrations of another part of the operation of the main and backup pawls used in this embodiment, FIGS. 29(a) and 29(b) are illustrations of how the lock gear works under the self-locking action of the main pawl, FIG. 29(a) representing the main pawl at its standby position, and FIG. 29(b) representing the main pawl at its locking position, FIGS. 30A(a) and 30A(b) illustrate a part of the operation of the clamp means in this embodiment, FIGS. 30B(a) and 30B(b) illustrate another part of the operation of the clamp means in this embodiment, and FIG. 30C illustrates further part of the operation of the clamp means in this embodiment.

As shown in FIG. 11, the bush 9 has through its center an axially extending through-hole 9a in which the root $4e_2$ of the second rotary shaft 4e of the reel shaft 4 can be fitted. The through-hole 9a is similar in sectional configuration to the root $4e_2$ of the second rotary shaft 4e, i.e., is of a rectangular shape in section. The bush 9 is further provided with four grooves 9b, 9c, 9d and 9e that are U-shaped in section and open on its outer face. The grooves 9b and 9d, and the grooves 9c and 9e are located in the diametrically opposite positions relative to the center of the bush 9. As will be described later, each groove receives a spring pin 12 (that is shown in FIG. 1B) therethrough. The bush 9 is further provided with an engaging groove 9f in which the inner end 8a of the pawl spring 8 is fitted and engaged.

The root $4e_2$ of the second rotary shaft 4e is fitted into the hole 9a of the bush 9, so that the bush 9 can be fitted over and connected to the second rotary shaft 4e, while the former cannot be rotated relative to the latter, whereby the spring force of the spring 8 always acts on the reel shaft 4 through the bush 9 in the winding direction β of the webbing 3.

Figure 12A:
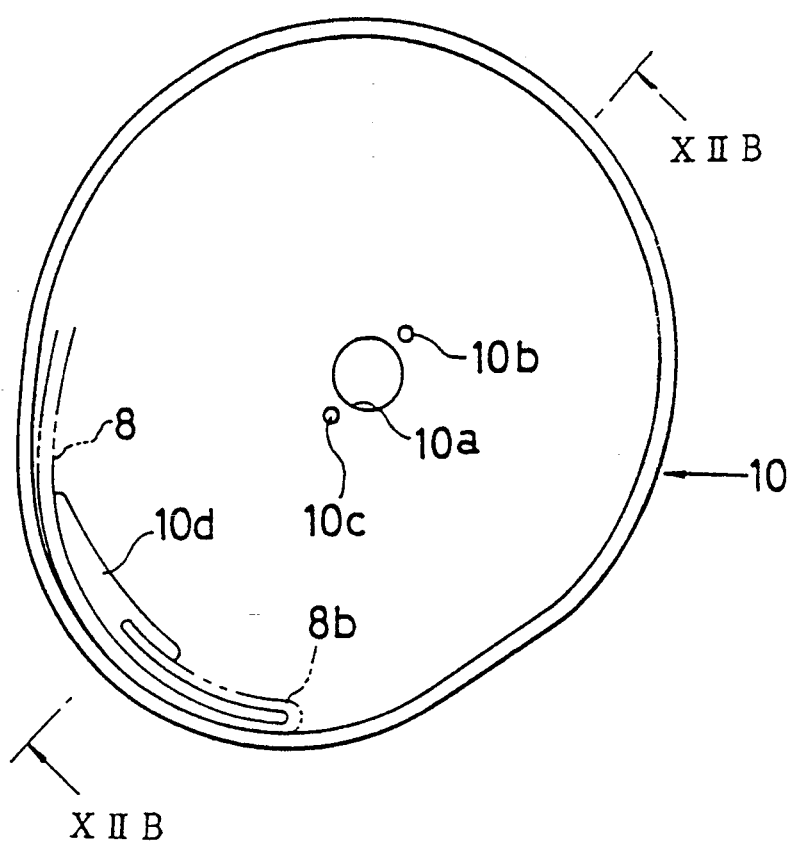
Figure 12B:
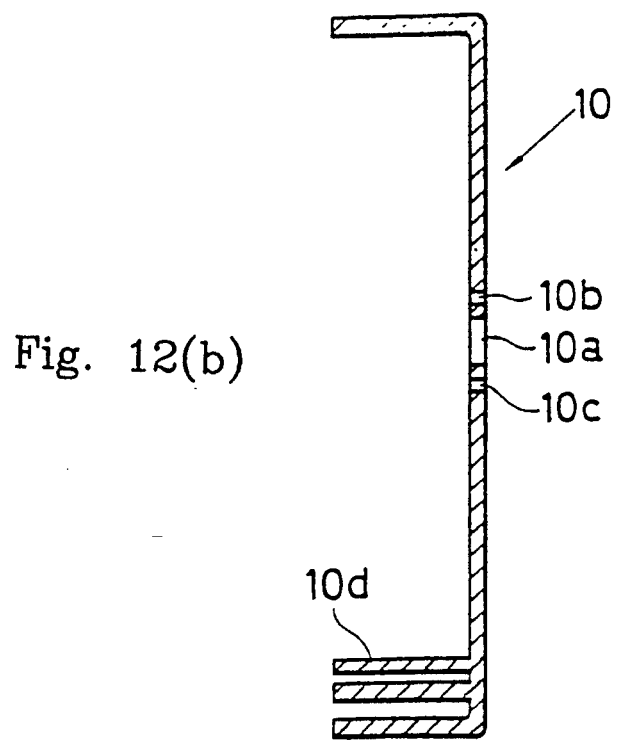

As shown in FIG. 12, the spring case 10 is almost centrally provided with a hole 10a, in which the root $4e_1$ of the second rotary shaft 4e of the reel shaft 4 is loosely fitted, and with a pair of small holes 10b and 10c with the hole 10a located between them, said holes 10b and 10c being adapted to receive the spring pin 12 therethrough. Further, in the vicinity of the outer end of the spring case 10 there is provided an engaging portion 10d, with which the outer end 8b of the spring 8 is engaged.

Figures 13A, 13B:
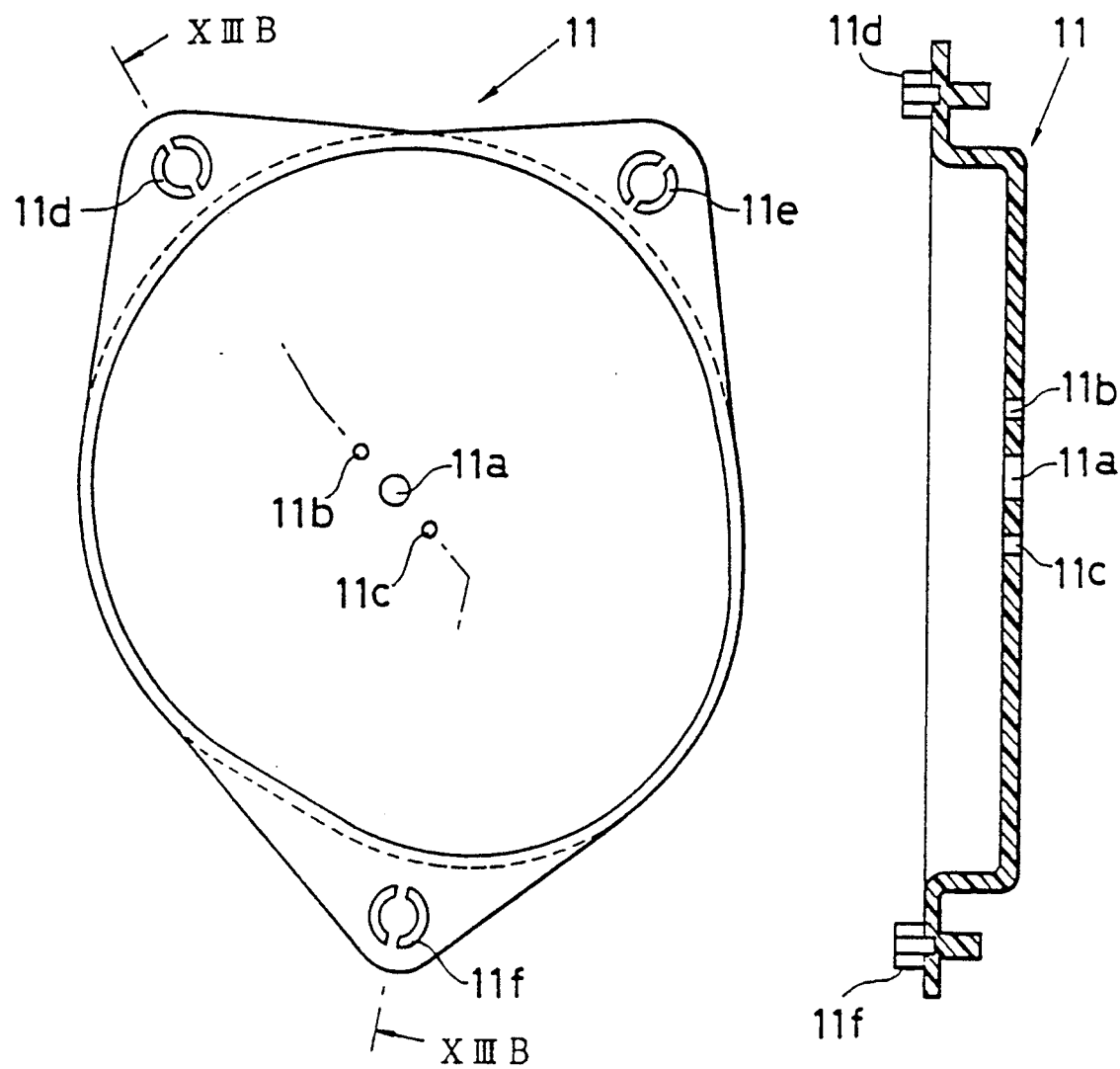

As shown in FIGS. 13(a) and 13(b), the cover 11 is almost centrally provided with a hole 11a for rotatably supporting the end $4e_1$ of the second rotary shaft 4e of the reel shaft 4, and with a pair of small holes 11b and 11c with the hole 11a located between them, said holes 11b and 11c being adapted to receive the spring pin 12 therethrough. Further, a flanged portion formed at the end of the cover 11 is provided with three engaging projections or pegs 11d, 11e and 11f. These engaging pegs 11d, 11e and 11f are engaged in the associated engaging holes 2h, 2i and 2j in the left side wall 2b of the frame 2, so that the biasing force applicator 5 can be detachably attached to the left side wall 2b of the frame 2.

So far, a seat belt retractor has been assembled by pre-assembling the biasing force applicator 5 in the form of a subassembly and attaching this subassembly to the left side wall 2b of the frame 2. Where the biasing force applicator 5 is pre-assembled, the spring force must always be imparted to the reel shaft 4 in the webbing winding direction β. It is then required to keep the power spring 8 wound up in the webbing unreeling direction by the given amount. To this end, such a spring pin 12 shown in FIG. 1B is used.

Figure 14:
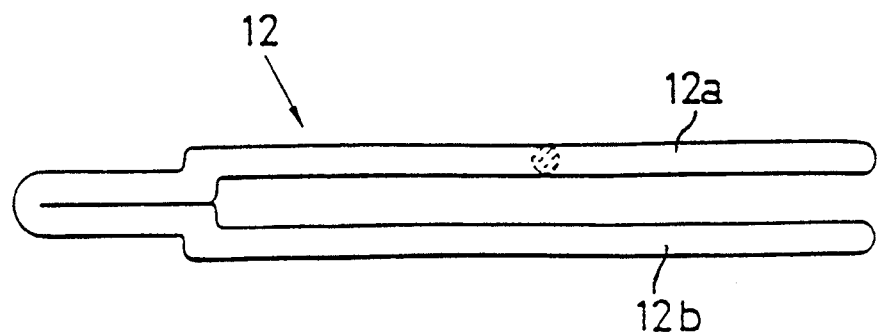

As illustrated at great length in FIG. 14, this spring pin 12 is formed by bending a resilient wire material, and includes two detent arms 12a and 12b. In order to prevent the winding-back of the power spring 8 in the state where the biasing force applicator 5 is pre-assembled, these detent arms 12a and 12b are passed through the small holes 11b and 11c in the spring cover 11, either one of the grooves 9b and 9c in the bush 9, either one of the grooves 9d and 9e in the bush 9 and the small holes 10b and 10c in the spring case 10, thereby achieving prevention of the winding-back of the power spring 8.

As can be seen from FIGS. 1A and 1C, on the other hand, the seat belt lock actuator means 6 is constructed from a first cover 13 for a lock gear, said cover being fixed to the right side wall 2a of the frame 2, a lock gear 14, an inertia device 15 rockingly attached to the lock gear 14, a control spring 16 disposed between the lock gear 14 and the inertia device 15, a pawl spring 18 received in the first recess 4h in the reel shaft 4 and compressed between the reel shaft 4 and the main pawl 17, a joint pin 19 passing through the axial hole 4m in the reel shaft 4, and a second cover 21 for the lock gear, which is fitted and supported by the right side wall 2a of the frame 2 to cover the first cover 13, lock gear 14, inertia device 15, main pawl 17, joint pin 19 and deceleration sensor means 7.

Additionally, the seat belt retractor 1 shown in FIG. 1A includes a webbing guide 22 for guiding the webbing 3.

Figure 15:
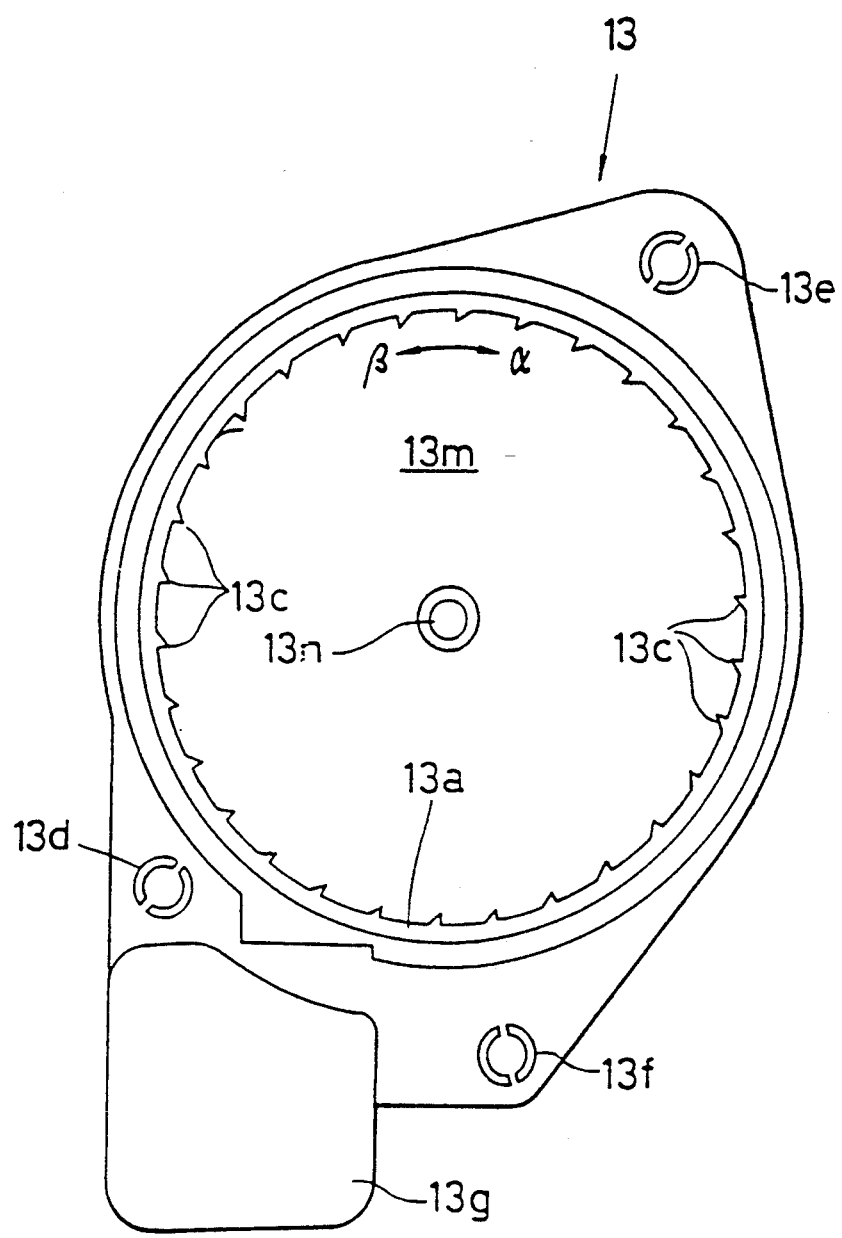
Figure 16:
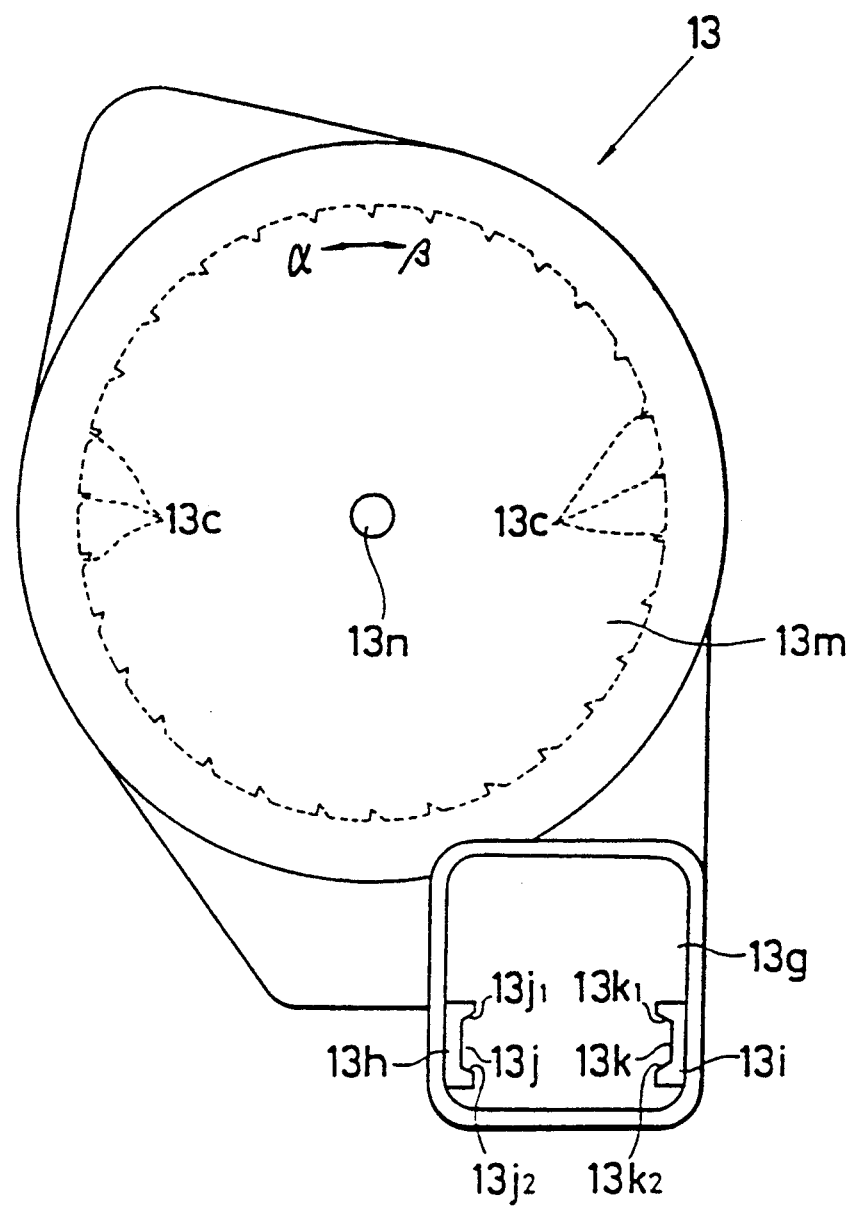

As can be seen from FIGS. 15 and 16, the first cover 13 for the lock gear has a ring form of member 13a on its surface facing the right side wall 2a of the frame 2, and this ring 13a is provided with a given number of teeth 13c, 13c, . . . all over the inner circumference. Each of these annular teeth 13c is in a triangular form with the surface facing the webbing unwinding direction being a substantially vertical plane and the surface facing the webbing winding direction β being a gently inclined plane. As illustrated in FIG. 15, the surface of the first cover 13 facing the right side wall 2a of the frame 2 is provided with three engaging projections or pegs 13d, 13e and 13f. These engaging pegs 13d, 13e and 13f are engaged in the engaging holes 2k, 2m and 2n formed in the right side wall 2a, respectively, so that the first cover 13 can be detachably attached to the frame 2.

As can be seen from FIG. 16, a housing 13g for the deceleration sensor 7 is open on the surface of the first cover 13 that is opposite to the surface thereof, on which the engaging pegs 13d, 13e and 13f are mounted. On the inner wall of the housing 13g, there is provided a pair of guide members 13h and 13i for guiding and fixedly supporting the deceleration sensor 7 in the vertical direction to the FIG. 16-bearing Sheet. On the faces of these guides 13h and 13i that are opposite to each other, there are recesses 13j and 13k that are of a trapezoidal shape in section and extend the lengthwise directions of the guides 13h and 13i. In other words, both side walls $13j_1$ and $13j_2$ of the recess 13j have slopes, and the same holds for both sides walls of $13k_1$ and $13k_2$.

Further, the side of the first cover 13 for the lock gear that is opposite to the side having the engaging pegs is provided with an annular array of teeth 13c together with a circular side wall 13m. That opposite side is also provided with a small hole 13n at the central location of the side wall 13m, i.e., an annular array of teeth 13c. The end portion of smaller diameter of the first rotary shaft 4d of the reel shaft 4 is almost closely but loosely fitted in this small hole 13n, so that the first rotary shaft 4d can be rotatably supported in the small hole 13n.

The lock gear 14, as shown in FIG. 17(a), is made up of a circular flat plate portion 14a, and an annular flange 14b formed on the outer peripheral end of the flat plate 14a. The flange 14b is provided with a given number of teeth 14c, 14c, . . . on its outer surface. Each of these teeth 14c is in triangular configuration with the side facing the webbing unwinding direction α having a relatively gentle slope and the side facing the webbing winding direction β being substantially vertical.

As can be seen from FIGS. 17(a) and 17(b), the flat plate 14a is vertically provided on the left-hand side (in FIG. 17(b); the side surrounded by the flange 14(b) with a spring bearing member 14d for supporting one end of the control spring 16, and this spring bearing 14d is vertically provided with a spring guide portion 14e in parallel with the flat plate 14a. Additionally, the flat plate 14a is vertically provided with a shaft 14f, by which the inertia device 15 is rockingly supported, as will be described later. Adjacent to this shaft 14f there is vertically located an arcuate detent member 14g.

As can be best seen from FIG. 17(c), this detent 14g is provided at its distal end with an engaging claw $14g_1$ with the upper face having a slope and projecting only slightly toward the shaft 14f. Hence, when the inertia device 15 is fitted over the shaft 14f, the inertia device 15 is forced against the slope of the engaging claw $14g_1$. This then allows the detent 14g to be elastically deformed to keep the gap between the shaft 14f and the detent 14g slightly open, so that the inertia device 15 can go over the engaging claw $14g_1$ and so can be received in a space surrounded by the shaft 14f and the detent 14g.

In this state, the inertia device 15 is kept from disengagement from the shaft 14, because its upward and axial movement, as viewed in FIG. 17(c), is restrained by the engaging claw $14g_1$. However, since a slight projection of the engaging claw $14g_1$ allows the inertia device 15 to be into slight engagement with the engaging claw $14g_1$, the inertia device 15 can go over the engaging claw $14g_1$ for easy disengagement from the shaft 14f by the application of slight external force thereto. This detent 14g permits easy engagement or disengagement of the inertia device 15 with or out of the shaft 14f, and ensures that the inertia device 15 is rockingly supported by the shaft 14f.

Further, the flat plate 14a is uprightly provided with first and second stoppers 14h and 14i, and includes an upright, cylindrical form of rotary shaft 14j at its center. It is understood that the first rotary shaft 4d of the reel shaft 4 passes through the hole in this cylindrical rotary shaft 14j, so that the latter shaft 14j can rotate around the former shaft 4d.

Furthermore, the flat plate 14a is provided with first, second and third cam holes 14k, 14m and 14n that extend through it. As can be best seen from FIG. 17(b), the peripheral edges of these 1st, 2nd and 3rd cam holes 14k, 14m and 14n are thicker than the flat plate 14a so as not only to ensure that cam followers are guided into engagement in the cam holes, but also to reinforce the peripheral edges of the cam holes. The details of the cam configurations of the 2nd and 3rd cam holes 14m and 14n will be described later. The first cam hole 14k is formed in arcuate configuration the center of which is the rotary shaft 14j.

On the other hand, the flat plate 14a is provided on its right-hand side (the side not surrounded by the flange 14b in FIG. 17(b)) with a spring bearing member 14p for supporting one end of the pawl spring 18, and this spring bearing 14p is uprightly provided with a guide portion 14q in parallel with the flat plate 14a.

Figures 18A, 18B:
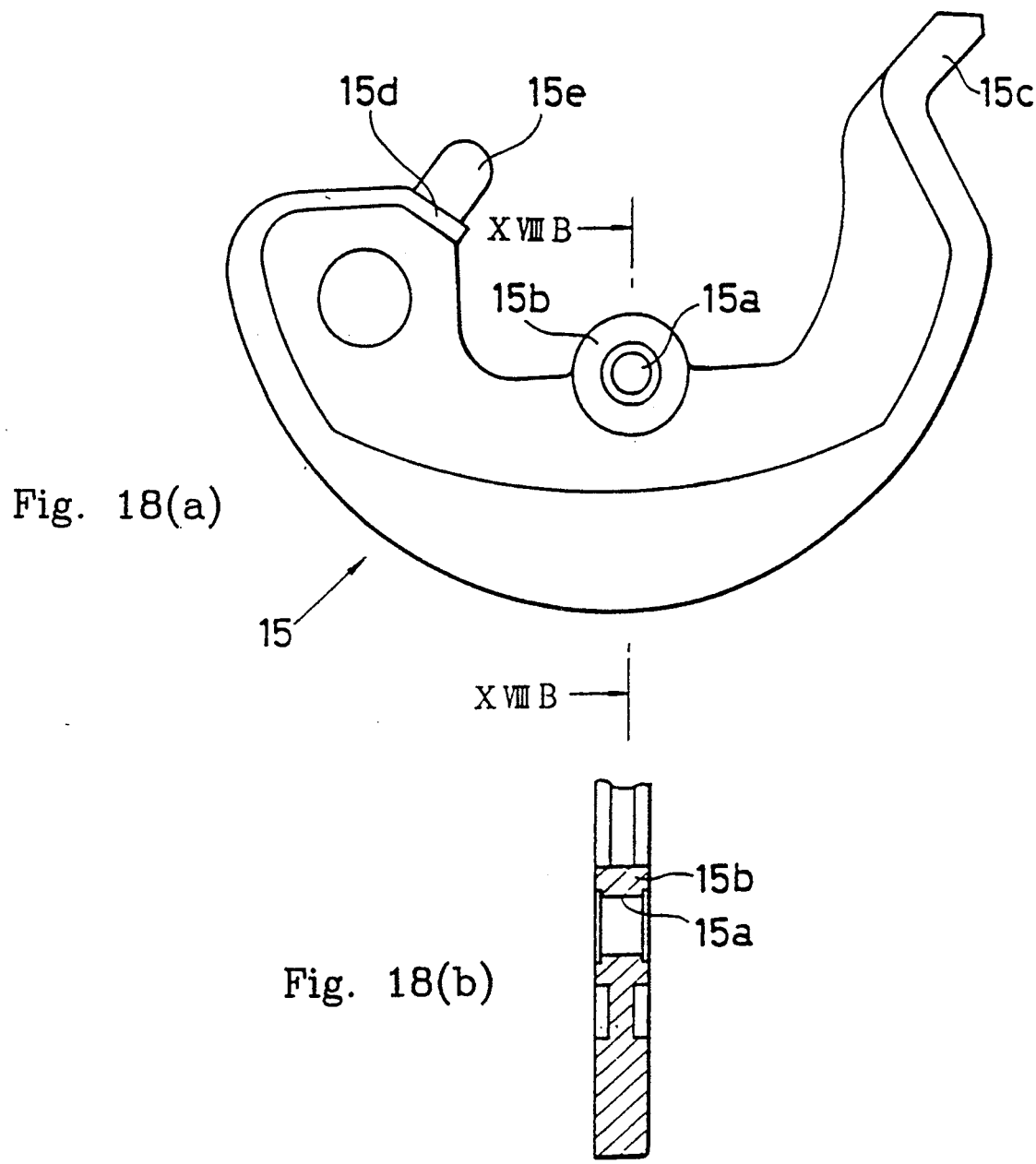

As illustrated in FIGS. 18(a) and 18(b), the inertia device 15 made up of a flat plate is formed in a generally C-shaped configuration, and includes a boss portion 15b holed at 15a in its center. Further, the inertia device 15 is provided at its one end with an engaging claw 15c and at the other end with a spring bearing 15d and guide 15e portion for supporting and guiding the other end of the control spring 16. As can be best seen from FIG. 2, this inertia device 15 is rockingly supported by the lock gear 14 by fitting its hole 15a over the shaft 14f of the lock gear 14. As already noted, the boss 15b of the inertia device 15 is engaged with the engaging claw 14g₁ of the detent 14g, thereby preventing disengagement of the inertia device 15 out of the shaft 14f.

As illustrated in FIG. 2, the control spring 16 is fitted over the guides 14e and 15e of the lock gear 14 and inertia device 15, while the inertia device 15 is rockingly supported by the shaft 14f, and is compressed between the spring bearings 14d and 15d. Hence, the spring force of this control spring 16 always biases the inertia device 15 with respect to the lock gear 14 in the α direction, so that the inertia device 15 is normally positioned in abutment against the first stopper 14h, as shown by a solid line. On the other hand, when the inertia device 15 is rotated with respect to the lock gear 14 in the β direction and against the spring force of the control spring 16, it is positioned in abutment against the second stopper 14i, as shown by a two-dotted line.

As shown in FIGS. 2 and 3, while the seat belt retractor 1 is full-assembled, the teeth 13c of the first cover 13 for the lock gear is located inside the annular flange 14b of the lock gear 14 and positioned between the flange 14b and the inertia device 15. In its normal state, the inertia device 15 is positioned in abutment against the first stopper 14h, as shown by a solid line in FIG. 2; the engaging claw 15c is positioned off or in no engagement with the teeth 13c. If, as shown by a two-dotted line in FIG. 2, the inertia device 15 comes in abutment against the second stopper 14i, the engaging claw 15c then moves to a position where it can be in engagement with the teeth 13c.

As the lock gear 14 turns in the webbing unwinding direction α when the engaging claw 15c is at that engagement position, the engaging claw 15c meshes with the teeth 13c, so that the lock gear 14 can be stopped there or restrained from further turning in the webbing unwinding direction α. In contrast, as the lock gear 14 turns in the webbing winding direction β when the engaging claw 15c is at the position wherein it can engage the teeth 13c, the engaging claw 15c moves along the gentle slope of the teeth 13c and against the spring force of the control spring 16 and then goes over the teeth 13c, whereby the lock gear 14 can turn in the webbing winding direction β.

As illustrated in FIGS. 9(a) and 9(b), the boss 17b of the main pawl is rotatably fitted into the third recess 4n in the flanged portion 4b, and so the main pawl 17 is rockable around its boss 17b with respect to the reel shaft 4. In that case, the main pawl 17 is restrained from further turning in the direction α by abutment with the step 4q formed on the flanged portion 4b, and is restrained from further turning in the direction β by abutment with the step 4r on the flanged portion 4b. In other words, these steps 4q and 4r act as stoppers that restrain the turning of the main pawl 17 in the direction α.

While the main pawl 17 is in abutment with the step 4q, its distal teeth 17d are located completely inside the outer surface of the flanged portion 4b, and while it is abutment the step 4r, its teeth 17d project out of the outer surface the flanged portion 4b, so that they can mesh with the teeth 23a of the right side wall 2a of the frame 2, as will be described later. On the end of the main pawl 17 that is opposite to the end having the teeth 17d there is a load-transmitting portion 17e. This load transmitter 17e is then defined by an arcuate segment concentric with the through-hole 17a and the boss 17b.

As shown by a two-dotted line in FIG. 9(a), the main pawl 17 is attached to the right-hand flanged portion 4b by rotationally fitting its boss 17b in the third recess 4n in the reel shaft 4. Where the main pawl 17 is mounted on the right-hand flanged portion 4b, the claw portion 17c is located within the second recess 4i, while the load transmitter segment 17e is in abutment with the load-bearing surface 4j of the reel shaft 4. In that case, the load transmitter segment 17e is constantly in abutment with the load-bearing surface 4j of the reel shaft 17e irrespective of where the main pawl 17 is positioned, because the load transmitter 17e and the load-bearing surface 4j of the reel shaft 4 are formed by the same concentric segments.

In this way, the load transmitter 17e is in abutment with the load-bearing surface 4j of the reel shaft 4, whereby a load w applied to the claw 17c of the main pawl 17 is transmitted from the load transmitter 17e to the load-bearing surface 4j, as shown in FIG. 9(b), and so is supported by the reel shaft 4. According to such a load-supporting structure,. the primary action on the main pawl 17 is compression rather than bending, because the teeth 17d and load transmitter 17e defining load points are relatively close to each other. In addition, the load transmitter 17e and load-bearing surface 4j are in surface contact with each other, so that the load can be transmitted to the reel shaft 4 over a large area, thereby dispersing the load and making the resulting stress relatively small. Hence, the main pawl 17 can be more reduced in strength than a conventional main pawl, and so may be formed of a relatively light material such as resin.

Further, a columnar cam follower 17f extends from the side of the main pawl 17 that is opposite to the load transmitter segment 17e, and is fitted in the third cam hole 14n in the lock gear 14 and guided along the third cam hole 14n.

The pawl spring 18 is received in the first recess 4h in the reel shaft 4, fitted in the spring guide 14q of the lock gear 14, and is compressed between the wall of the first recess 4h and the spring bearing 14p. Hence, the pawl spring 18 constantly biases the main pawl 17 in the webbing unwinding direction α with respect to the reel shaft 4. The biasing force of this pawl spring 18 then permits the main pawl 17 to be normally in abutment with the step 4q formed on the flanged portion 4b.

As shown in FIGS. 20(a) to 20(c), the joint pin 19 includes a main body 19a of a circular shape in section, and the main body 19a is provided at the right-hand end (in FIG. 20(a)) with an arm 19b extending at right angles with the main body 19a. The arm 19b is provided at its one end with a cam follower 19c of a circular shape in section. The cam follower 19c is fitted and guided into the second cam hole 14m in the lock gear 14.

The main body 19a is provided at the other end with a shaft portion 19d of a rectangular shape in section, which is fitted in a hole formed at one end of the backup pawl 20 to be described later, wherein it is restrained from relative rotation. Hence, as the cam follower 19c is guided into the second cam hole 14m to turn the arm 19b, the main body 19a turns. The turning of the main body 19a is then transmitted to the backup pawl 20, which in turn rotates in cooperative association with the movement of the cam follower 19c guided into the second cam hole 14m.

As shown in FIGS. 10(a) and 10(b), a boss portion 20b of the backup pawl 20 is rotatably fitted in the fifth recess 4x in the flanged portion 4c of the reel shaft 4, so that the backup pawl 20 is rockable around its boss 20b with respect to the reel shaft 4. In that case, the backup pawl 20 is restrained from further turning in the direction α by abutment with a portion 4z' of the step 4z formed on the flanged portion 4c, said portion 4z' being located at the outermost peripheral edge 4y end, and is restrained from further turning in the direction B by abutment with the step 4A on the flanged portion 4c. In other words, these steps 4z', and 4A act as stoppers that restrain the turning of the backup pawl 20 in the direction α.

While the backup pawl 20 is in abutment with the step 4z', its distal teeth 20d are located completely inside the outer surface of the flanged portion 4c, and while it is abutment the step 4A, its teeth 20d project out of the outer surface of the flanged portion 4c, so that they can mesh with the teeth 2g of the right side wall 2b of the frame 2, as will be described later. On the end of the claw portion 20 that is opposite to the teeth 20d there is a load-transmitting portion 20e. This load transmitter 20e is then defined by an arcuate segment concentric with the through-hole 20a and the boss 20b.

Where the backup pawl 20 is mounted on the left-hand flanged portion 4c, as shown in FIGS. 10(a) and 10(b), the claw portion 20c is located within the fourth recess 4u, while the load transmitter segment 20e is in abutment with the load-bearing surface 4v of the reel shaft 4. In that case, the load transmitter segment 20e is constantly in abutment with the load-bearing surface 4v of the reel shaft 4 irrespective of where the backup pawl 20 is positioned.

In this way, the load transmitter 20e is in abutment with the load-bearing surface 4v of the reel shaft 4, whereby a load w' applied to the claw 20c of the backup pawl 20 is transmitted from the load transmitter 20e to the load-bearing surface 4v, as shown in FIG. 10(b), and so is supported by the reel shaft 4. According to such a load-supporting structure, the primary action on the backup pawl 20 is compression rather than bending, because the teeth 20d and load transmitter 20e defining load points are relatively close to each other, as is the case with the main pawl 17. In addition, the load transmitter 20e and load-bearing surface 4v are in surface contact with each other, so that the load can be transmitted to the reel shaft 4 over a large area, thereby dispersing the load and making the resulting stress relatively small. Hence the backup pawl 20 can be more reduced in strength than a conventional main pawl, and so may be formed of a relatively light material such as resin.

Figure 22:
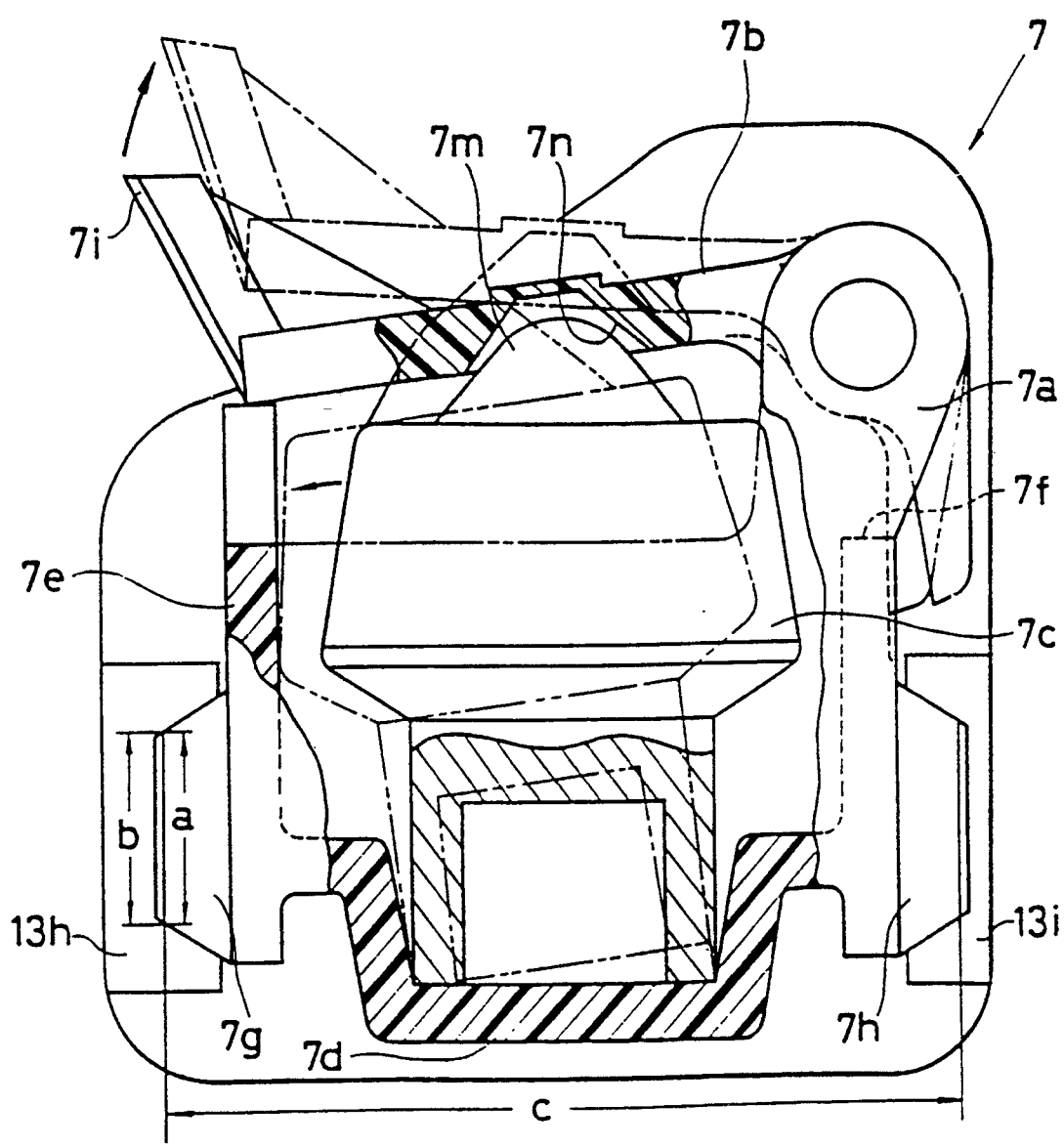

As can be best seen from FIG. 22, the deceleration sensor means 7 includes a case 7a, a lever 7b rockingly supported by the case 7a, and an inertia device 7c that is housed in the case 7a, and is normally located at a position shown by a solid line and is rockingly moved to a position shown by a two-dotted line when excessive vehicle deceleration is sensed.

Figure 23B:
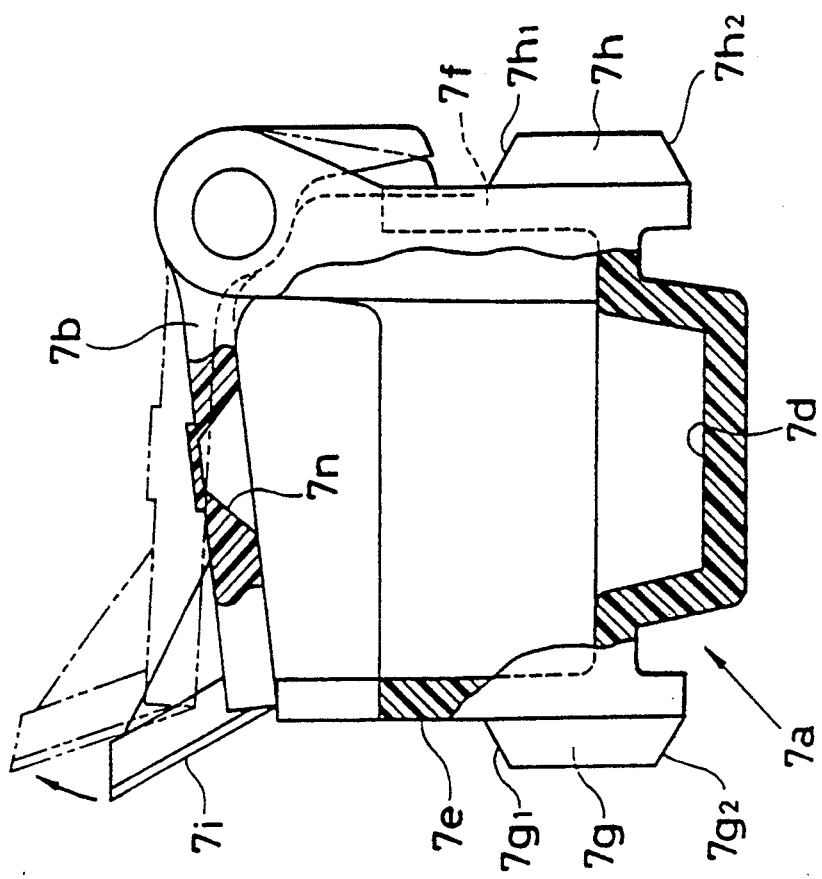
Figure 23A:
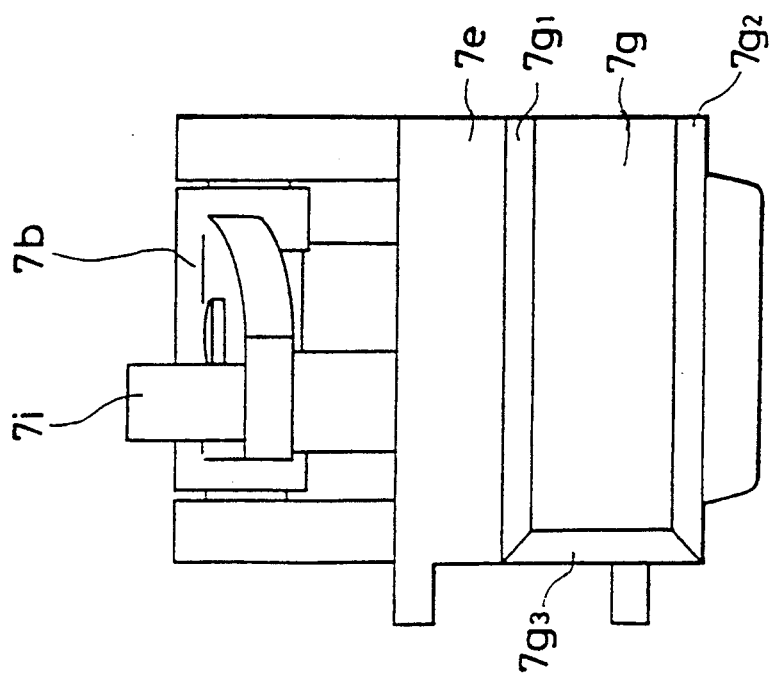

As can be best seen from FIG. 23, the case 7a is formed in container configuration of a rectangular shape in section, and is provided on its bottom with a portion 7d on which the inertia device 7c is placed. The front and rear walls 7e and 7f of the case 7a are provided with engaging projections or pegs 7g and 7h, each of a trapezoidal shape in section. More specifically, both side walls $7g_1$ and $7g_2$, $7h_1$ and $7h_2$ of the engaging pegs 7g and 7h incline at the same angles of inclination of both side walls $13j_1$ and $13j_2$, $13k_1$ and $13k_2$ of the recesses 13j and 13k of the guides 13h and 13i. As can be clearly seen from FIG. 23(a), one lengthwise end of one engaging peg 7h has a slope $7g_3$. Although not shown, one lengthwise end of another engaging peg 7h has a similar slope as well. These pegs 7g and 7h are engaged within the recesses 13j and 13k in the guides 13h and 13i of the first cover 13 for the lock gear.

The lever 7b is pitovally supported at its rear end by the case 7a, and is provided at its front end with an engaging claw 7i capable of meshing with the teeth 14c of the lock gear 14.

Figure 24C:
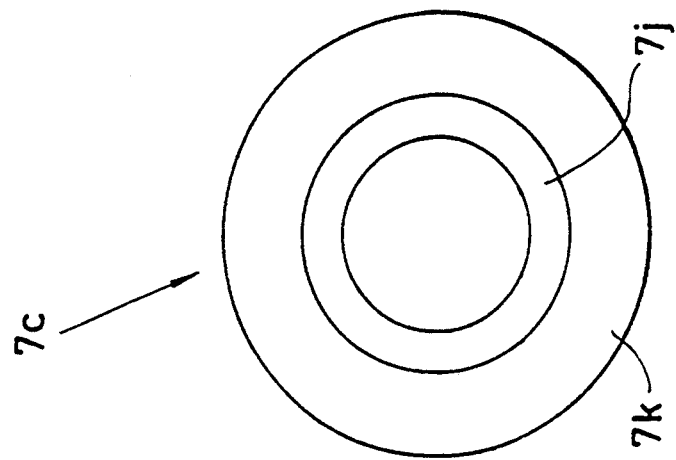
Figure 24B:
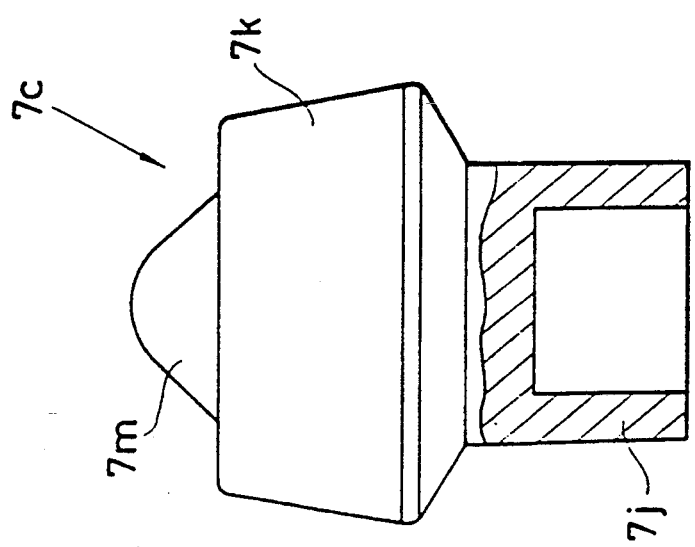
Figure 24A:
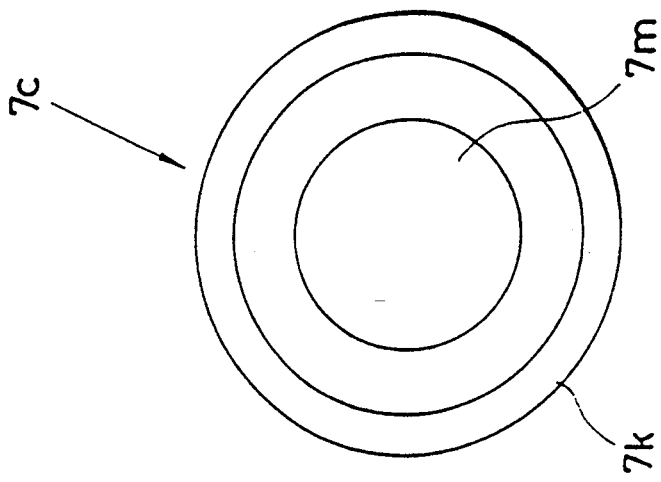

As shown in FIGS. 24(a) to 24(c), the inertia device 7c is provided with a hollow cylindrical portion 7j of smaller mass at its lower section and a solid, truncately conical portion 7k of larger diameter and mass that is located just above the portion 7j. The angle of inclination of the outer conical surface is determined such that it becomes substantially equal to that of the inner surface of the front wall 7e, when the rocking movement of the inertia device 7c reaches a maximum. Additionally, a working cone 7m is formed on the portion 7k of larger mass. Making the mass of the upper portion 7k larger than the mass of the lower portion 7j thus makes the inertia device 7c more sensitive to deceleration.

As can be seen from FIG. 22, the thus constructed inertia device 7 is placed on the portion 7d of the case 7a, as mentioned just above. In its normal state, the inertia device 7c is erected upright on the portion 7d, as shown by a solid line, with the upper end of the working cone 7m, placed above, being fitted in a truncately conical dent 7n in the lever 7b. In this normal state, the lever 7b is held at a virtually horizontal state shown by a solid line, at which the lever 7b has its engaging peg 7i in no mesh with the teeth 14c of the lock gear 14.

With a deceleration of given magnitude acting on the vehicle, the inertia device 7c tilts until, as shown by a two-dotted line, the outer face of the portion 7k of larger mass abuts substantially against the inner face of the front wall 7e. As the inertia device 7c tilts in this way, the working cone 7m pushes up the lever 7b or causes the lever 7b to swivels up to a position shown by a two-dotted line, at which the lever 7b has its engaging peg in mesh with the teeth 14c of the lock gear 14.

As already mentioned, the inertia device 7c has the working cone 7m. Upon the inertia device 7c tilting a little the working cone 7m works to increase the swiveling stroke of the lever 7b. This then enables the arm of the lever 7b to be reduced and the deceleration sensor 7 to be made compact.

The thus constructed deceleration sensor 7 is housed in its housing 13g by fitting the engaging pegs 7g and 7h in the recesses 13j and 13k in the guides 13h and 13i of the housing 13g along the lengthwise direction, as shown in FIG. 22. In that case, very smooth fitting of the engaging pegs 7g and 7h in the associated recesses 13j and 13k is achieved because of the engaging pegs 7g and 7h having given slopes at their one ends, as mentioned above.

The length a between the upper and lower side walls 7g$_1$, 7g$_2$, 7h 1 and 7h$_2$ at the extending ends of both the engaging pegs 7g and 7h is longer than the distance b between them at the positions corresponding to the extending end locations of the engaging pegs 7g and 7h in the recesses 13j and 13k. While the engaging pegs 7g and 7h are fitted in the recesses 13j and 13k, the case 7a is relatively firmly supported by the guides 13h and 13i due to the elastic forces of the housing 13g and case 7a by their elastic deformation. Especially because the side walls of the engaging pegs 7g, 7h and recesses 13j, 13k have given slopes, some wedge effect is obtained between the guides 13h, 13i and the engaging pegs 7g, 7h, so that the case 7a can be much more firmly supported by the guides 13h and 13i.

As shown in FIGS. 1A and 2, clamp means 25 is provided on the frame 2 above the reel shaft 4, whereby, if required, the webbing 3 is clamped to prevent further winding of the webbing 3. This clamp 25 includes a clamp member 26 for giving clamping force to the webbing 3 and a force-bearing member for bearing the force of the clamp member 26 for firmly fastening the webbing 3 between them.

Figure 25A:
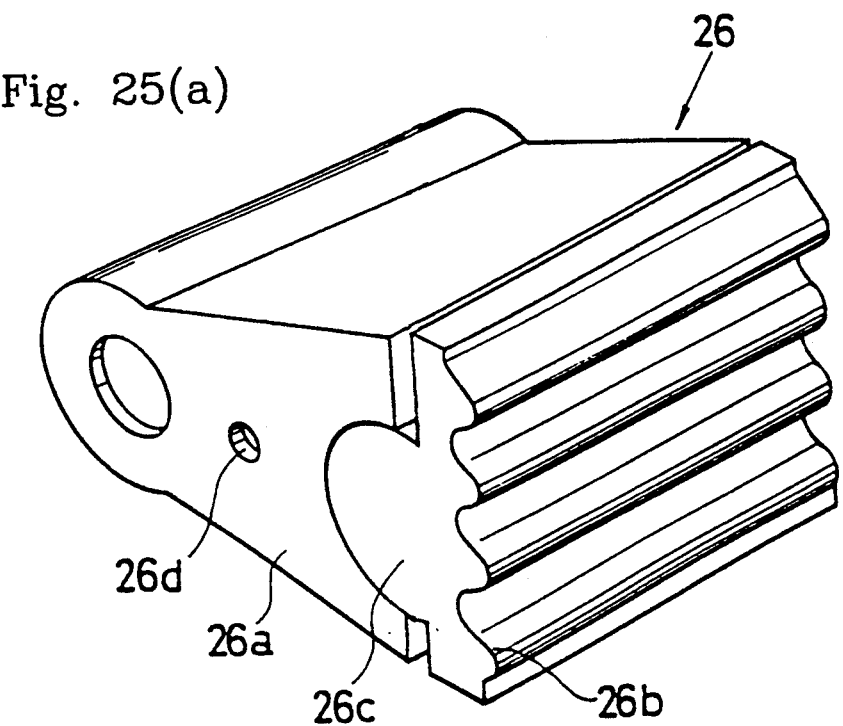
Figure 25B:
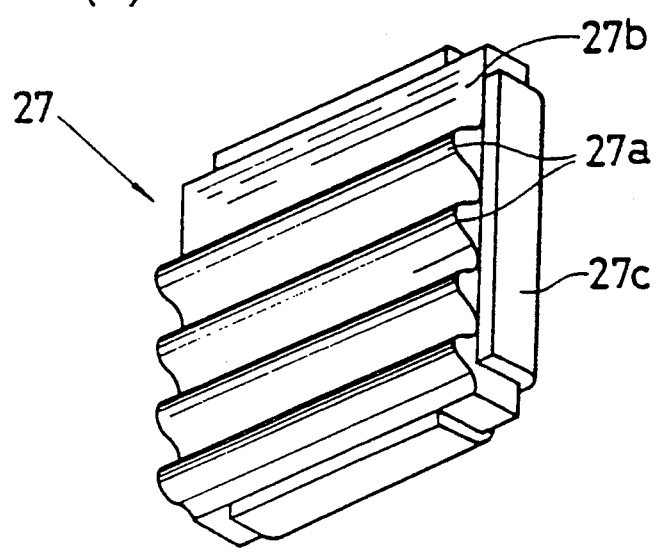

As shown in FIGS. 25(a) and 25(b), the clamp member 26 is made up of a lever 26a mounted on the right and left side walls 2a and 2b for rocking motion, and a toothed member 26c mounted at a free end of the lever 26a for rocking motion at a given angle and having a given number of teeth 26b for fastening the webbing 3 between it and the force-bearing member 27. Further, the lever 26a is provided on its right and left sides with holes 26d (only the left one of which is illustrated in FIG. 25(a), and the other of which will hereinafter be referred to by the same reference numeral) in which a lever screw 31 (shown in FIG. is fixedly inserted, said lever screw being passed through and guided along guides holes 2p and 2q. This clamp member 26 is designed to fasten the webbing 3 between it and the force-bearing member 27 to be described later. In that case, the clamp member 26 defines a toggle link mechanism which increases in force as it rotates.

As can be seen from FIG. 25(b), on the other hand, the force-bearing member 27 is built up of a toothed member 27b having a given number of corrugated teeth 27a, and a holder 27c for holding the toothed member 27b. The holder 27c is attached to a force-bearing portion 2y of the frame 2, and held by a guide holder member 28 (shown in FIGS. 1A and 2) formed integrally with the webbing guide 22 for vertically slidable displacement. The force-bearing portion 2y of the frame 2 is corrugated so as to increase its rigidity, and is designed such that, when the webbing 3 is fastened between the clamp member 26 and the force-bearing member 27, as will be described later, it is somewhat elastically deformed by the force of the clamp member 26, thus allowing that elastic force to act on the force-bearing member 27. Hence, the webbing 3 is firmly clamped between the clamp member 26 and the force-bearing member 27 by the elastic force of the force-bearing portion 2y.

Additionally, an arm 24 is located adjacent to the right side wall 2a for connecting an extension 31a (shown in FIG. 3) of the lever screw 31 of the lever 26 that projects out of the guide hole 2p in the right side wall 2a with a connector 23e of a lock ring 23. As can be seen from FIGS. 26(a) and 26(b), the arm 24 includes a substantially triangular main body 24a that is provided at one corner with a hole 24b in which a connecting pin 32 (shown in FIG. 2) is fitted and supported, said connecting pin being fitted in a groove 23f in the lock ring 23. Onto one of the remaining corners there is loosely fitted a pivot pin 33 (shown in FIG. 3) fixedly fitted in a hole 2v in the right side wall 2a. In association with this, there is provided a hole 24c that makes the arm 24 pivotal around the pivot pin 33. In the remaining corner there is provided an engaging groove 24e that engages a shaft fixed to the clamp member 26, as will be described later. The arm 24 is further provided with an engaging shaft 24e with which one end of a torsion spring 29 is engaged. This torsion spring 29 is supported by the pivot pin 33.

While an outer peripheral surface of smaller diameter of the lock ring 23 is fitted in the hole 2d in the right side wall 2a, the connecting pin 32 fixed to the arm 24 is fitted into the groove 23f in the connector 23e of the lock ring 23, and the engaging groove 24d in the arm 24 is engaged with the extension 31a of the lever screw 31 that projects out of the guide hole 2p in the right side wall 2a. Further, the torsion spring 29 supported by the pivot pin 33 fitted into the hole 24c is engaged at one end within a hole 2w in the right side wall 2a, and at the other end with the engaging shaft 24e of the arm 24 with the torsion spring 29 being twisted by a given amount.

In this way, the lock ring 23, arm 24 and torsion spring 29 are assembled into one part. This then enables the arm 2 to be swiveled and biased by the restoring force of the torsion spring 29 around the supporting shaft of the spring 29 in the counterclockwise direction in FIG. 2 (i.e., in the webbing 3 unwinding direction $\alpha$). In the normal state, the lever screw 31 attached to the lever 26a is located at the lower end of the guide hole 2p and the clamp member 26 is located at the lowermost position of the range in which it is tunable, so that the teeth 26b of the toothed member 26c can be spaced far away from the teeth 27a of the toothed member 27b on the frame side, thus enabling the webbing 3 to be set free without being clamped.

The lock ring 23, on the other hand, is biased by the restoring force of the torsion spring 29 in the clockwise direction in FIG. 2 by way of the connecting pin 32, so that in its normal state, one end of the projection 23d on the outer surface can be in abutment against one end of the associated indent 2f in the inner face of the hole 2d in the right side wall 2a, thereby keeping the lock ring 23 from further turning in the clockwise direction. In this state a peripheral gap having a given length $\eta$ is defined between the other ends of the indent 2f and projection 23d.

In this state, the phase of the teeth 2g of the left side wall 2b goes on at a given angle (of, e.g., 3°) in the webbing unwinding direction $\alpha$ with respect to the phase of the teeth 23a of the lock ring 23. It is here noted that these teeth 23a and 2g are in the same triangular configuration.

The steep slopes of these teeth 23a and 2g are in such configuration that, after the teeth 17d and 20d of the main and backup pawls 17 and 20 are guided by the cam holes 14m and 14n into the standby positions where they start to mesh with the associated teeth 23a and 2g—this will be described later, the main and backup pawls 17 and 20 can be rotated into the positions at which the teeth 17d and 20d are in complete mesh with the teeth 23a and 2g; in other words, the main and backup pawls 17 and 20 have each a self-locking action on the reel shaft 4. The details of this self-locking action will be described later.

As can also be seen from FIG. 2, the force-bearing member 27 is constantly biased downward by the holder spring 34 and, it its normal state, is held at its lowermost position. The holder spring 34 is made of a belt form of spring material and is formed in an angled configuration having at both its ends portions 27a and 27b for giving force to the force-bearing member 27, as shown in FIG. 27.

Reference will now be made to how the main and backup pawls 17 and 20 operate with reference to FIG. 38A(I)(a) to FIG. 2A(I)(d), FIG. 28A(II)(a) to FIG. 28A(II)(d), FIG. 38B(I)(e) to FIG. 28B(I)(h) and FIG. 28B(II)(e) to FIG. 28B(II)(h). It is here noted that the upper group of figures (I) are intended to illustrate the operation of the main pawl 17 and the lower group of figures (II) to illustrate the operation of the backup pawl 20. Below these figures will be referred to as, for example, FIG. 28A(a), when discussing both the upper part (I), for example, FIG. 28A(I)(a), and the corresponding lower part (II), for example, FIG. 28A(II)(a). In connection with these figures, it is also understood that they are schematic representations on the same plane of the teeth 23a, engaging peg 17d, and three cam holes 14k, 14m and 14n on the main pawl 17 side; the parts on both the main and backup pawls 17 and 20 sides being shown, as viewed from the right-hand side in FIG. 3.

Referring to FIG. 28A(I)(a) to FIG. 28A(I)(d) and FIG. 28A(II)(a) to FIG. 28(A)(II)(d). the spring force of the pawl spring 18 (which is not shown in these figures, and so for which see FIG. 1A, etc.) allows the reel shaft 4 (the parts shown in these figures are only two, the through-hole 4m through the main body 19a of the joint pin 19 passes, and the main pawl 17 mounted on the reel shaft 4) to be constantly biased in the β direction relative to the lock gear 14 (the parts shown in FIG. 28A(I)(a) to FIG. 28A(I)(d) and FIG. 28A(II)(a) to FIG. 28A(II)(d) are only three, the cam holes 14k, 14m and 14n), so that the reel shaft 4 can be turned in the β direction relative to the lock gear 14 until the main body 19a comes into abutment against the upper edge of the cam hole 14k, and held in its normal state, as shown in FIG. 28A(a).

In this normal state, the cam follower 19c of the joint pin 19 abuts against the upper edge of the cam hole 14m, and the cam follower 17f of the main pawl 17 abuts against the upper edge of the cam hole 14n. Then, the engaging claw 17d of the main pawl 17 is spaced far away, or disengaged, from the teeth 23a of the lock ring 23. On the other hand, the backup pawl 20 is located at the position shown FIG. 28A(a) in operative association with the angle of turning of the joint pin 19 that is determined by where the cam followers 19c and 17f abut against the upper edges of the cam holes 14m and 14n. In other words, the engaging claw 20d of the backup pawl 20 is spaced far away, or disengaged, from the teeth 2g of the left side wall 2b.

As the reel shaft 4 rotates around the first rotary shaft 4d (which is not shown in FIG. 28A(I)(a) to FIG. 28A-(I)(d) and FIG. 28A(II)(a) to FIG. 28A(II)(d), and so for which see FIG. 8) in the direction relative to the lock gear 14, i.e., the through-hole 4m with the main body 19a passing through it rotates around the first rotary shaft 4d in the direction relative to the first to third holes 14k, 14m and 14n, the main body 19 and the boss 17b of the main pawl 17 move slightly downward relative to and along the first cam hole 14k.

At the same time, the cam follower 17f moves somewhat downward, while it is guided by the third cam hole 14n. With this, the boss 17b move somewhat left in these figures due to the cam configuration of the first cam hole 14k. However, since the amount of movement of the cam follower 17f in the left direction is somewhat larger than the amount of movement of the boss 17b in the left direction, the main pawl 17 turns somewhat in the β direction, whereby the engaging claw 17d is brought close to the teeth 23a.

At the same time, the cam follower 19c moves downward, while it is guided by the second cam hole 14m. The cam follower 19c also moves right due to the cam configuration of the second cam hole 14m, and this causes the arm 19b to turn somewhat around the main body 19a in the direction. With this turning of the arm 19b in the direction, the main body 19a turns somewhat in the direction. However, by reason of the fact that the reel shaft 4 turns in the direction, the main body 19a and arm 19b do not substantially turn relative: to the reel shaft 4. Hence, the backup pawl 20 remains disengaged from the teeth 2g of the left side wall 2b, as shown in FIG. 28A(b).

As shown in FIG. 28A(c), as the reel shaft 4 turns further relative to the lock gear 14 in the direction, the main body 19a and boss 17b move downward and left along the first cam hole 14k. At the same time, the cam follower 17f moves somewhat downward, while it is guided by the third cam hole 14n. Because the amount of the cam follower 17f moving further in the left direction is somewhat larger than the amount of the boss 17b moving further in the left direction, the main pawl 17 turns slightly yet further in the β direction, so that the engaging claw 17d can be brought closer to the teeth 23a.

At the same time, the cam follower 19c moves slightly yet further in the downward and left directions, while it is guided by the second cam hole 14m. In that case, because the cam follower 19c moves slightly yet further in the downward and left directions, the arm 19b does not substantially turn. However, by reason of the fact that the reel shaft 4 is turning further in the x direction, the main body 19a and arm 19b turn relative to the reel shaft 4 in the β direction. This then causes the backup pawl 20 to turn somewhat relative to the reel shaft 4 in the β direction, thus bringing its engaging claw 20d closer to the teeth 2g.

As shown in FIG. 28A(d), as the reel shaft 4 turns in the α direction relative to the lock gear 14, the main pawl 17 again turns slightly yet further in the β direction relative to the reel shaft 4, thus bringing the engaging claw 17d much closer to the teeth 23a. Similarly, the backup pawl 20 turns slightly yet further in the β direction, thus bringing the engaging claw 20d much close to the teeth 2g.

As shown in FIG. 28B(e), upon the reel shaft 4 turning further in the α direction relative to the lock gear 14, the main and backup pawls 17 and 20 similarly turn further relative to the reel shaft 4 in the β direction, thus moving the engaging claw 17d to the location at which it can be in mesh with the teeth 23a. The backup pawl 20 turns slightly yet further in the β direction, so that the engaging claw 20d can be brought even much closer to the teeth 2g.

As can be seen from FIG. 28B(f), the further relative turning of the reel shaft 4 in the direction allows the engaging claw 17d to approach the teeth 23a by the preset amount, but is restrained from further approaching the teeth 23a. When, in this state, the reel shaft 4 turns further in the direction, the forefront tooth $17d_1$ of the teeth 17d of the main pawl 17 abuts against the steep slope of the toot 23a. This location of the main pawl 17 defines the standby location at which the teeth 17d of the main pawl 17 start to mesh with the teeth 23a of the right side wall 2a. As the reel shaft 4 turns further in the direction following the abutment of the tooth $17d_1$ against the steep slope of the tooth 23a, the tooth $17d_1$ is guided along the steep slope of the tooth 23a toward its bottom, so that the main pawl 17 can turn in the β direction.

Thus, the further relative turning of the reel shaft 4 in the α direction allows the tooth top of the engaging claw 17d to abut against the bottom of the tooth 23a or be in complete mesh with the tooth 23a of the right side wall 2a, so that the main pawl 17 can be locked up, as shown in FIG. 28B(g). The movement of the main pawl 17 from the standby to locking location is carried out by being guided along the steep slope of the tooth 23a rather than by the cam hole 14n, and so allows the main pawl 17 to have the self-locking action on the reel shaft 4.

In the state where the teeth 17d of the main pawl 17 are in complete mesh with the teeth 23a of the right side wall 2a, on the other hand, the forefront teeth $20d_1$ of the teeth 20d of the backup pawl 20 is in abutment against the steep slope of the tooth 2g, thus defining the standby location at which the teeth 20d of the backup pawl 20 start to mesh with the tooth 2g of the left side wall 2b.

As shown in FIG. 28B(h), the further relative turning of the reel shaft 4 in the direction allows the engaging claw 17d to be in complete engagement with the teeth 23a. The backup pawl 20, on the other hand, is guided by the steep slopes of the teeth 2g of the left side wall 2b to produce self-locking action on the reel shaft, as is the case with the main pawl 17, and is then in complete mesh with the teeth 2g, so that it can be locked up.

Thus, the engagement of the engaging claw 20d of the backup pawl 20 with the teeth 2g takes place a little after the engagement of the engaging claw 17d of the main pawl 17 with the teeth 23a.

In the following description, detailed explanation will be made of how the main pawl 17 and lock gear 14 move, when the main pawl 17 moves from its standby state to its self-locking state or from FIG. 28B(f) to FIG. 28B(g), and of the shapes of the third cam and teeth 23a of the right side wall 2a that effect such movement.

FIGS. 29(a) and 29(b) are enlarged views of FIGS. 28B(f) and 28B(I)(g), respectively.

First, reference will be made to the cam shape of the third cam hole 14n for controlling the turning of the main pawl 17, when the reel shaft 4 turns in the direction relative to the lock gear 14. At the location shown in FIG. 18A(a) where the main pawl 17 is not in operation, the cam follower 17f is located at the uppermost end position of the third cam hole 14n. The cam shape of the third cam hole 14n is designed such that, when the reel shaft 4 turns in the α direction relative to the lock gear 14, the cam follower 17f is displaced downward from the uppermost end position of the third cam hole 14n, while it is guided by a first guide cam surface $14n_1$ of the third cam hole 14n, and this downward displacement then causes the main pawl 17 to turn in the β direction until it moves to the standby position shown in FIG. 29(a), so that the teeth 17d approaches the teeth 23a of the right side wall 2a.

The cam shape of the third cam hole 17f is further designed such that, when the cam follower 17f moves to the position in the third cam hole 14n shown in FIG. 29(a), the cam follower 17f is no longer guided by the third cam hole 14n, even when the reel shaft 4 turns in the α direction relative to the lock gear 14. In other words, the thus shaped third cam hole 14n enables the tops of the teeth 17d not to reach the bottoms of the teeth 23a.

Still further, the cam shape of the third cam hole 14n designed such that, when the main pawl 17 moves from the state of FIG. 29(a) to the locking position of FIG. 29(b) at which the teeth 17d are in complete engagement with the teeth 23a, it has the self-locking action by the action of the steep slopes of the teeth 23a; when this self-locking action is exerted, the cam follower 17f causes the lock gear 14 (shown by the first to third cam holes 14k, 14m and 14n in FIGS. 29(a) and 29(b)) to turn reversely yet slightly in the β direction through the second guide cam surface $14n_2$ of the third cam holed 14n. The thus shaped third cam hole 14n enables the engaging claw 7i of the lever 7b of the deceleration sensor 7 to be disengaged set free from the teeth 14c of the lock gear 14, when the main pawl 17 is in complete engagement with the teeth 23a, thereby warding off end locking.

More specifically, the third cam hole 14n is made up of a portion for controlling the operation of the main pawl 17 comprising the first guide cam surface $14n_1$ for guiding the cam follower 17f from the uppermost position of the cam hole shown in FIG. 28A(a)—at which the main pawl 17 is not in operation—to the standby position shown in FIG. 28B(f), and a portion for controlling the reverse turning of the lock gear 14 comprising the second guide cam surface $14n_2$ that, when the cam follower 17f moves from the standby position shown in FIG. 28B(f) to the locking position shown in FIG. 28B(g), transmits the working force of the cam follower 17f to the lock gear 14, thus causing the lock gear 14 to turn reversely in the webbing winding direction.

On the other hand, the steep slopes of the teeth 23a of the right side wall 2a are preset at a given angle of inclination θ so as to allow the main pawl 17 to move from the standby position shown in FIG. 29(a) to the complete engagement with the teeth 23a, shown in FIG. 29(b), by its self-locking action, said angle of inclination θ being defined by an angle of the steep slope of each tooth 23a with respect to the line connecting the abutment 6 of the tooth 23a against the tooth $17d_1$ with the center of rotation s of the main pawl 17, as shown in FIG. 29(a).

The steep slopes of the teeth 2g of the left side wall 2b are also present at a given angle of inclination so as to allow the backup pawl 20 to have the self-locking action.

Reference will then be made to the cam shape of the second cam hole 14m for controlling the turning of the backup pawl 20, when the reel shaft 4 turns in the direction relative to the lock gear 14.

The cam shape of the second cam hole 14m is designed such that the backup pawl 20 operates after the main pawl 17 has operated but in the same manner as does it. In particular, it is designed such that, when the main pawl 18 moves from the standby position shown in FIG. 28B(f) to the locking position shown in FIG. 28B(g), i.e., when the main pawl 17 is locked up by its self-locking action, the backup pawl 20 is put in the standby state, as shown in FIG. 28B(g).

The thus shaped second cam hole 14m permits the main pawl 17 to be first locked up with the engaging claw 17d in complete engagement with the teeth 23a of the right side wall 2a. With this, the backup pawl 20 is put in the standby state. Then, the backup pawl 20 is locked up with the engaging claw 20d in complete engagement with the teeth 2g of the left side wall 2b. Thus, following the engagement of the engaging claw 17d of the main pawl 17 with the teeth 23a, the engagement of the engaging claw 20d of the backup pawl 20 with the teeth 2g takes place. This makes a failure in the engagement of the main and/or backup pawl 17, 20 with the teeth 23a and/or 2g unlikely, or ensures that such engagement occurs.

With the unwinding force removed from the webbing 3, the spring force of the pawl spring 18 causes the lock gear 14 to turn in the α direction relative to the reel shaft 4, so that the main and backup pawls 17 and 20 can be disengaged from the teeth 23a and 2g by the cam holes 14n and 14m, respectively. This then permits the reel shaft 4 to rotate freely, so that the reel shaft can be rotated by the biasing force applicator 5 in the webbing winding direction for webbing winding.

Reference will now be made to how the webbing 3 is fastened by the clamp 25.

Figure 30A:
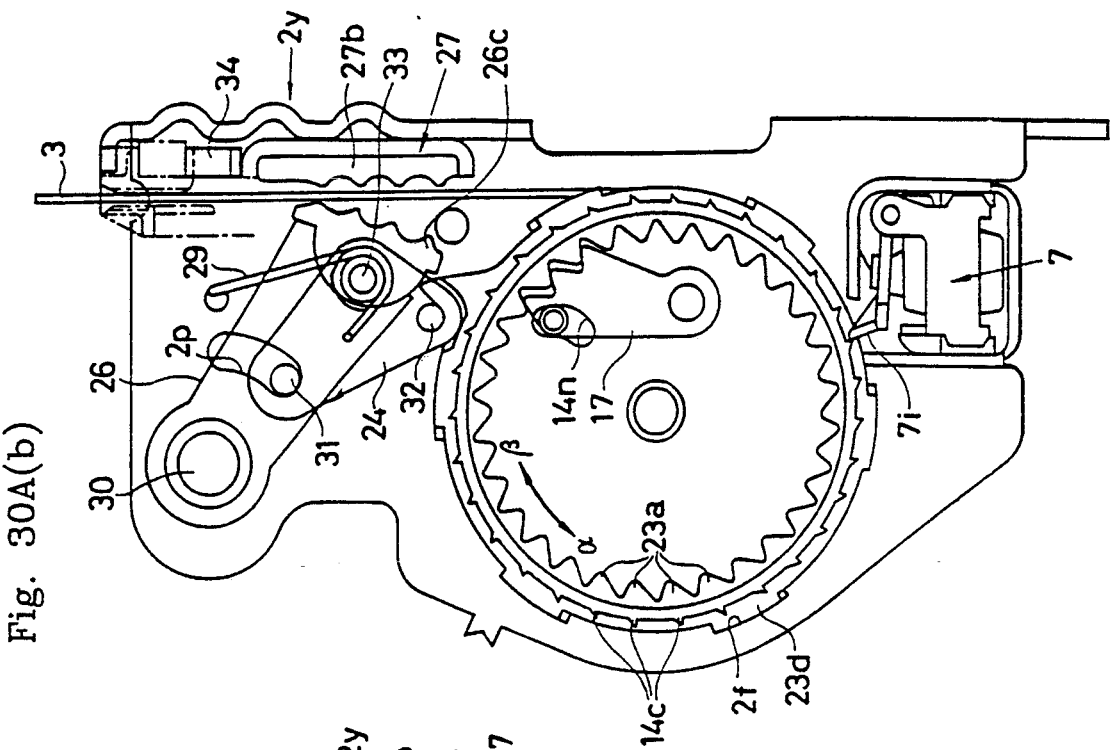
Figure 30A:
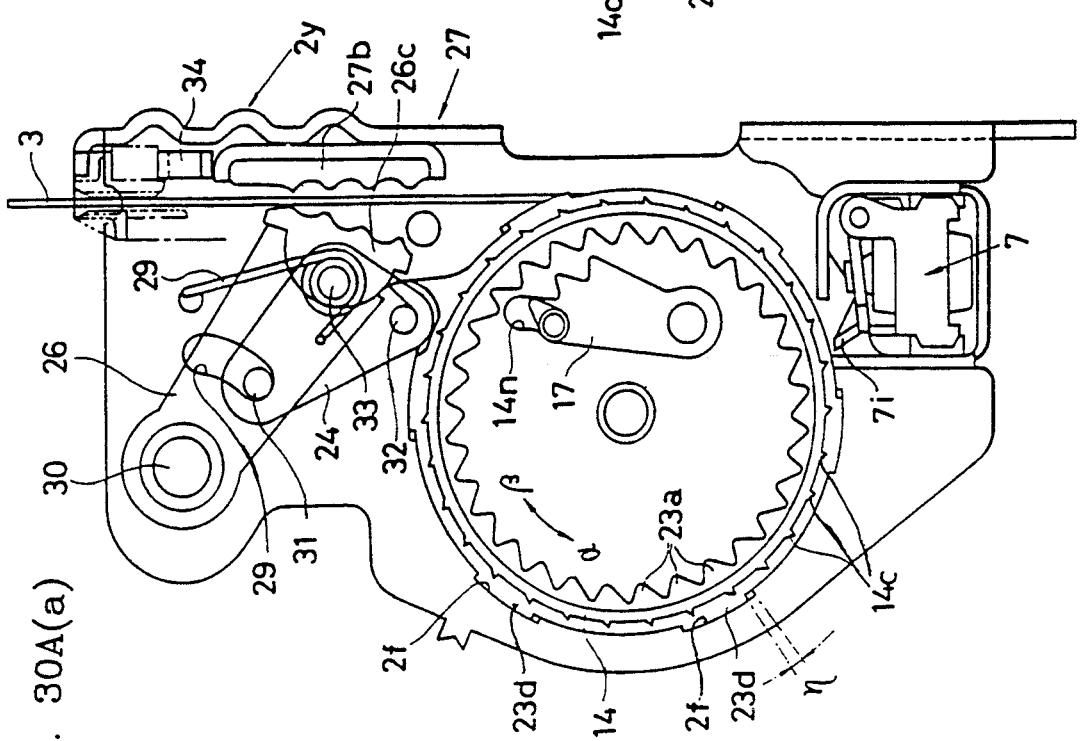
Figure 30C:
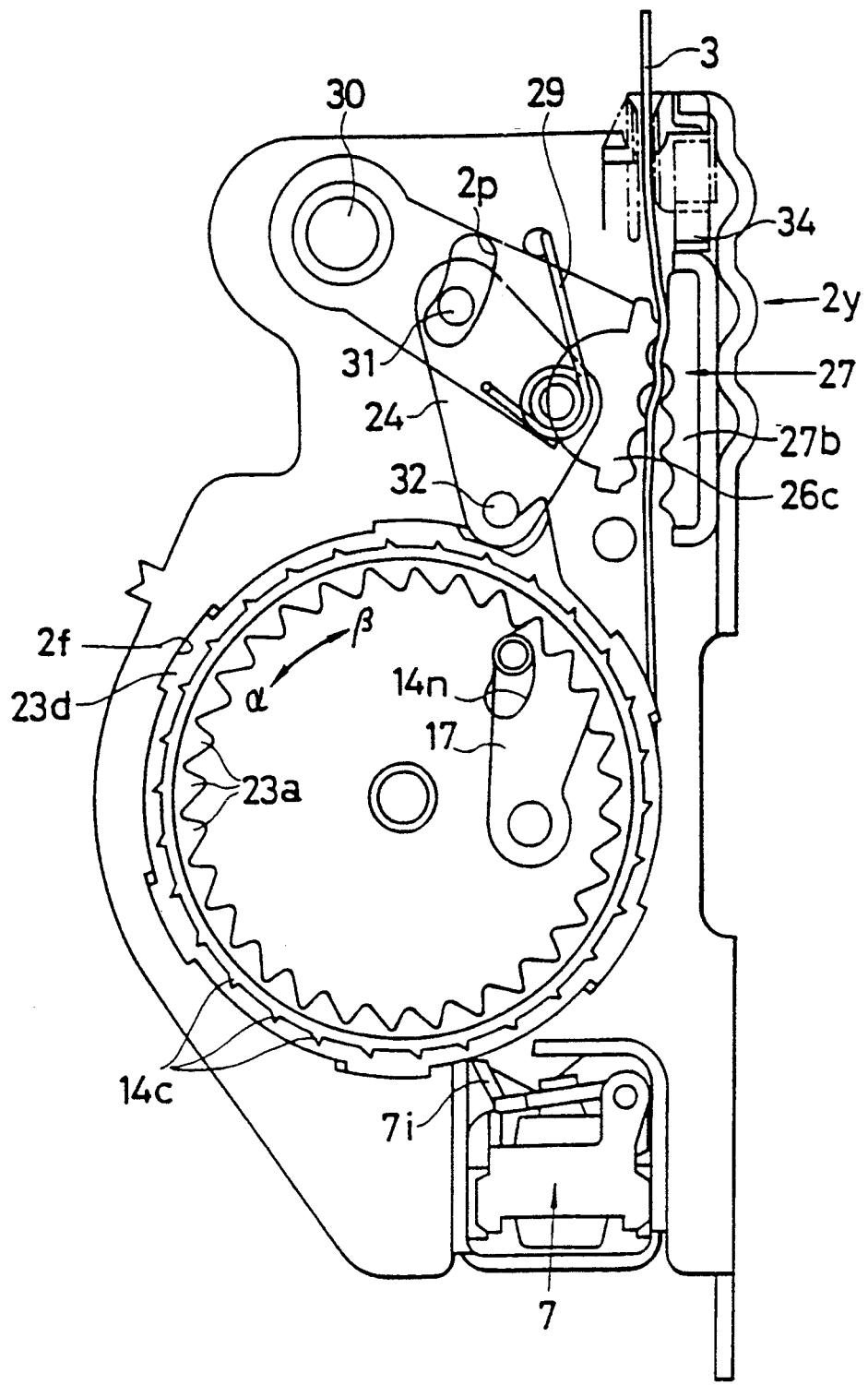

When large deceleration is applied to a vehicle in the normal state shown in FIG. 30A(a) due to an accident such as a crash, the inertia device 7c of the deceleration sensor 7 tilts forward, as shown in FIG. 30A(b). With this, the lever 7b swivels clockwise, and the engaging claw 7i moves to the position at which it can mesh with the teeth 14c of the lock gear 14. This deceleration, on the other hand, tends to move the occupant forward due to inertia, causing the webbing 3 to be unreeled and thereby turning both the reel shaft 4 and the lock gear 14 in the webbing unwinding direction α.

Immediately following the turning of the lock gear 14, the teeth 14c mesh with the engaging claw 7i to lock the lock gear 14 against turning; only the reel shaft 4 rotates in the webbing unwinding direction, so that relative rotation can occur between the reel shaft 4 and the lock gear 14. This then permits the main pawl 17 to move rotationally toward the 23a of the lock ring 23, as already mentioned.

As the reel shaft 4 turns further in the unwinding direction α of the webbing 3, the main pawl 17 is locked up with the engaging claw 17d in complete mesh with the teeth 23a, as already mentioned and shown in FIG. 30B(a) as well. At the position where the main pawl 17 is locked, the lock gear 14 turns slightly yet reversely (in the winding direction β of the webbing 3); the engaging claw 7i is disengaged from the teeth 14c of the lock gear 14, so that the engaging claw 7i can return to the original position and the lock gear 14 can be set free.

As the reel shaft 4 turns further in the unwinding direction α of the webbing 3, the turning of the reel shaft 4 is transmitted to the lock ring 23 through the main pawl 17 to turn the lock ring 23 in the unwinding direction α. This permits the clamp member 26 to turn counterclockwise, so that the toothed member 26c can approach the toothed member 27b the side of the frame 2 until the uppermost teeth 26b of the toothed member 26c bites into the webbing 3.

Following the biting of the tooth 26b into the webbing 3, the clamp member 26 turns further counterclockwise by the unwinding force of the webbing 3 but with no need of the rotational force of the lock ring 23, whereby the webbing 3 is automatically fastened between both the toothed members 26c and 27c. In other words, once the tooth 26c has bitten into the webbing 3, the clamp 25 has automatic locking up means or the self-locking action on the webbing 3; the webbing 3 can be locked up.

In that case, since the force-bearing portion 2y of the frame 2 is elastically deformed by the clamping force of the clamp member 26, the elastic restoration force of the force-bearing portion 2y acts on the force-bearing member 27. This ensures that the webbing 3 is firmly fastened between both the toothed members 26c and 27c to prevent further unwinding of the webbing 3.

In some cases, the clamp 25 fails to produce sufficient clamping force on the webbing 3. There is then some slip between the webbing 3 and the toothed members 26c and 27c, resulting in further unwinding of the webbing 3. However, since the lock ring 23 turns further counterclockwise, the peg 23d of the lock ring 23 abuts at the other end against the other end of the dent 2f in the right side wall 2a, thereby preventing further turning of the lock ring 23 in the unwinding direction α. Consequently, the turning of the reel shaft 4 in the unwinding direction α of the webbing 3 is completely and surely stopped. This ensures that the unwinding of the webbing 3 is completely stopped. The abutment of the other end of the peg 23d against the end of the dent 2f also ensures that the unwinding force on the webbing 3 is born by the right side wall 2a through the lock ring 23.

In order to unlock the webbing 3, the unwinding force is removed from the webbing 3. Then, the force-bearing member 27 is moved downward by the spring force of the holder spring and returns to the initial position. Simultaneously with this, the arm 24 is turned counterclockwise by the spring force of the torsion spring 29. Hence, the clamp member 2 turns clockwise to the initial position, while the lock ring 23 turns clockwise to the initial position. Thus, the webbing 3 is unlocked.

Reference will now be made to how the thus constructed retractor of the instant embodiment works.

Normal State In Which Deleceration Larger Than A Predetermined Value Is Not Applied To The Vehicle In this normal state, the inertia device 7c of the deceleration sensor 7 does not tilt forward; the lever 7b is located at the position shown by a solid line in FIG. 2, with the engaging claw 7i spaced away from the teeth 14c of the lock gear 14. Similarly, the engaging claw 15c of the inertia device 15, the main pawl 17, and the backup pawl 20 are all spaced away from the associated parts, as shown in FIGS. 2 and 4.

Accordingly, it is primarily the biasing force applicator 5 which works in the seat belt retractor 1 in this state. In other words, the reel shaft 4 is biased in the webbing winding direction $\beta$ by the spring force of the power spring 8 of the biasing force applicator 5; the webbing 3 is wound up.

Unfastened Seat Belt State

In this state, a tongue (not show) attached to the webbing 3 and a buckle member (not shown) remains separated from each other. Accordingly, the webbing 3 is wound up by the spring force of the power spring 8, as already mentioned.

In What State The Seat Belt Retractor Is When The Webbing Is Unwound

As the occupant unwinds the webbing 3 for wearing the seat belt, both the reel shaft 4 and the bush 9 turn in the webbing unwinding direction , whereby the power spring 8 is wound up.

In What State The Seat Belt Retractor Is When The Webbing Is Set Free After The Connection Of The Tongue With The Buckle Member When the occupant has connected the tongue with the buckle member, the webbing 3 has been unwound a length longer than required for normal wearing. Accordingly, with the occupant releasing the webbing 3, it is wound and fitted around the occupant's body by the spring force of the power spring 8. It is here noted that the spring force of the power spring 8 is suitably preset such that the webbing 3 does not give the occupant any sense of oppression. While the vehicle is on wheels, the seat belt retractor 1 remains held in this state, unless deceleration larger than a predetermined value acts on the vehicle.

How The Seat Belt Retractor Works When Deceleration Larger Than A Predetermined Value Acts On The Vehicle When the vehicle is braked hard or excessively decelerated while on wheels, both the seat belt lock actuator 6 and the deceleration sensor 7 work. At the first stage of operation, the inertia device 7c of the deceleration sensor 7 tilts forwards (to the position shown by a two-dotted line in FIG. 2) due to inertia, whereby the lever 7b swivels upward to the position shown by a two-dotted line in FIG. 2, at which the engaging claw 7i of the lever 7b can mesh with the teeth 14c of the lock gear 14. On the other hand, the occupant tends to move forward due to this excessive deceleration, resulting in unwinding of the webbing 3. With the unwinding of the webbing 3, both the reel shaft 4 and the lock gear 14 tend to turn in the unwinding direction $\alpha$.

However, since the teeth 14c of the lock gear 14 mesh immediately with the engaging claw 7e, the turning of the lock gear 14 in the unwinding direction $\alpha$ is immediately stopped. As a result, only the reel shaft 4 continues to turn in the unwinding direction $\alpha$; the reel shaft 4 turns in the $\alpha$ direction relative to the lock gear 14.

At the second stage of operation, the relative turning of the reel shaft 4 in the direction causes the turning of the main pawl 17 in the $\beta$ direction relative to the reel shaft 4 until the main pawl 17 is locked up with the engaging claw 17d in mesh with the teeth 23a, as shown in FIG. 28A(I)(a) to FIG. 28A(I)(d), FIG. 28A(II)(a) to FIG. 28A(II)(d), FIG. 28B(I)(e) to FIG. 28B(I)(h) and FIG.28B(II)(e) to FIG. 28B(II)(h). In that case, just when the main pawl 17 moves from the standby position to the locking position, the lock gear 14 turns slightly yet reversely in the webbing winding direction $\beta$ to disengage the main pawl 17 from the teeth 23a. When the main pawl 17 is locked up, the backup pawl 20 comes to the standby position. Then, as the reel shaft 4 turns further in the $\alpha$ direction, the backup pawl 20 meshes with the teeth 2g, whereby it is locked up.

After the position where the main pawl 17 is locked up has been determined, the reel shaft 4 turns further in the $\alpha$ direction, so that the lock ring 23 turns in the direction. This then causes the clamp member 26 to turn counterclockwise to bring the toothed member 26c close to the toothed member 27b on the side of the frame 2 until the tooth 26b of the toothed member 26c bites into the webbing 3. After this, the webbing 3 is fastened between both the toothed members 26c and 27c by the unwinding force on the webbing force 3 under the self-locking action of the clamp 25. Thus, the webbing is locked against further unwinding.

In some cases, the clamp 25 fails to produce sufficient clamping force on the webbing 3. There is then some slip between the webbing 3 and the toothed members 26c and 27c, resulting in further unwinding of the webbing 3. However, since the lock ring 23 turns further counterclockwise, the peg 23d of the lock ring 23 abuts at the other end against the other end of the dent 2f in the right side wall 2a, thereby preventing further turning of the lock ring 23 in the unwinding direction $\alpha$. Consequently, the turning of the reel shaft 4 in the unwinding direction $\alpha$ is completely and surely stopped. This ensures that the unwinding of the webbing 3 completely stopped. With this, the webbing 3 is more fastened between the toothed members 26c and 27c of the clamp member 26. Hence, any further unreeling of the webbing 3 by rewinding or elongation of the webbing 3 is surely avoided.

As a result, the occupant is surely and firmly secured by the seat belt. In this state, the engaging claw 7i of the deceleration sensor 7 is disengaged from the teeth 14c of the lock gear 14 and so the lock gear 14 is set free, so that the webbing 3 can be easily rewound on the reel shaft 4.

How The Seat Belt Retractor Works When Drastic Unwinding Force Acts On The Webbing In this state, the webbing 3 is drastically unwound, so that the reel shaft 4, lock gear 14 and inertia device 15 are likely to turn drastically in the webbing unwinding direction $\alpha$. However, since the spring force of the control spring 16 is not so large, the control spring 16 contracts, giving rise to an inertial delay in the motion of the inertia device 15. In other words, does not only the inertia device 15 revolve together with the lock gear 14 in the webbing unwinding direction , but it rotates in the $\beta$ direction relative to the lock gear 14 as well.

This rotation of the inertia device 15 causes the engaging claw 15c to move to the position where it abuts against the second stopper 14i, as shown by a two-dotted line in FIG. 2, and mesh with the teeth 13c of the first cover 13. This makes it possible to secure the inertia device 15 against revolution and the lock gear 14 against turning in the webbing unwinding direction $\alpha$. Hence, only the reel shaft 4 is permitted to turn in the webbing unwinding direction. This then allows the reel shaft 4 to turn in the z direction relative to the lock gear 14.

The relative turning of the reel shaft 4 in the $\alpha$ direction causes the main pawl 17 to move to the position where, as mentioned above, it meshes with the teeth 23a, after which the backup pawl 20 turns to the position where it meshes with the teeth 2g. As a result, the turning of the reel shaft 4 in the webbing unwinding direction α is avoided. As mentioned above, further relative turning of the reel shaft 4 in the direction causes the lock ring 23 to turn in the webbing unwinding direction z following the determination of the position where the main pawl 17 is locked up. This rotation of the lock ring 23 is stopped upon the other end of the peg 23d abutting against the end of the dent 2f. This ensures that any drastic unreeling or unwinding of the webbing 3 is avoided.

Here, too, the lock gear 14 turns slightly yet reversely in the webbing winding direction β, whereby the engaging claw 15c of the inertia device 15 is disengaged from the teeth 13c of the first cover 13 to set the lock gear 14 free. Thus, the webbing 3 can be easily rewound on the reel shaft 4.

It is understood that the above embodiment is intended to illustrate and not to limit the invention, and so many design modifications may be made to the invention.

In the above embodiment, for instance, six dents 2f are equidistantly provided in the inner surface of the hole 2d in the right side wall 2a, and six pegs 23d are equidistantly provided on the outer surface of the lock ring 23. However, the pegs may be provided on the inner surface of the hole 2d while the dents may be made in the outer surface of the lock ring 23. In addition, any desired number of pegs and dents may be provided at any desired intervals.

While the above embodiment has been described with reference to the biasing force applicator means 5 having no comfort device, it is understood that the invention is applicable to a seat belt retractor including a comfort device.

While the above embodiment has been described with reference to a seat belt retractor designed to impart tension to the webbing by the biasing force applicator means, it is understood that the invention is applicable to a tensionless seat belt retractor.

As can be understood from the above explanation, the seat belt retractor according to the invention includes the first engaging member having the functions of locking the reel shaft against rotation and transmitting the rotational force of the reel shaft to the clamp member through the arm. It is thus possible to reduce the number of parts of a transmission mechanism for transmitting the rotational force of the reel shaft to the clamp member in operable association with the first engaging member, and to dispense with a cam hole for controlling the parts of the transmission mechanism formed on the lock ring. This makes it possible to fabricate a seat belt retractor that is simplified in the structure of the transmission mechanism, makes it easy to machine the lock ring, and is light in weight and low in cost.

In particular, the invention makes the rotation of the lock ring smooth and stable, because the outer surface of the lock ring is slidable, while it is guided by the inner surface of the circular hole in the frame.

Further, the invention makes it unnecessary to transmit the rotational force of the reel shaft to the clamp member because the clamp member is allowed to have a self-locking action. This makes it possible to form the arm of light material, thus enabling the seat belt retractor to be much more reduced in weight.

What we claim is:

1. A seat belt retractor including a reel shaft for winding a webbing on it, a frame for rotatably supporting both ends of said reel shaft, lock means that is located between said frame and said reel shaft, and permits the rotation of said reel shaft in the normal state and is actuated, as occasion demands, to lock said reel shaft against at least its rotation in the webbing unwinding direction, deceleration sensor means that is actuated when deceleration larger than a predetermined value is applied to a vehicle, lock actuator means that turns in synchronism with the rotation of said reel shaft in the normal state, and rotates relative to said reel shaft in operable association with the actuation of said deceleration sensor means, thereby actuating said lock means, clamp means for locking said webbing, and an operable member that operates in operable association with the actuation of said lock means to actuate said clamp means, characterized in that:

said lock means including a lock ring having a first portion to be engaged, said first portion being provided at one end of said reel shaft of said frame and designed to be rotatable by a given amount; a first engaging member having a first engaging portion that is rotatably supported at one end by one end of said reel shaft and can be engaged at the other end with said first portion to be engaged, said first engaging portion being designed such that, in the normal state, it is held at a position where it is not engaged with said first portion to be engaged and, as occasion demands, it turns to a position where it is engaged with said first portion to be engaged; a second portion to be engaged, that is provided at the other end of said reel shaft; and a second engaging member having a second engaging portion that is rotatably supported at one end by the other end of said reel shaft and can be engaged at the other end with said second portion to be engaged, said second engaging portion being designed such that, in the normal state, it is held at a position where it is not engaged with said second portion to be engaged and, as occasion demands, it turns to a position where it is engaged with said second portion to be engaged, said first engaging portion being formed on the inner circumference of said lock ring; the outer circumference of said lock ring being slidably fitted into a circular hole formed in said frame; one of a recess and a projection being formed on the inner circumference of said circular hole; the other of a recess and a projection being formed on the outer circumference of said lock ring; the circumferential length of said recess being longer than that of said projection by a given amount; and said lock ring being located in said circular hole to allow said projection to be disposed in said recess, said clamp means including a clamp member for having clamping force on said webbing and a member for bearing the clamping force of said clamp member, said webbing being clamped between said clamp member and said force bearing member under the clamping force of said clamp member, thereby locking up said webbing, and said operable member comprising an arm that is engaged with said lock ring and said clamp member, thereby transmitting the rotational force of said reel shaft transmitted to said lock ring to said clamp member.

2. A seat belt retractor as claimed in claim 1, characterized in that said clamp member includes a lever comprising a toggle link mechanism and a toothed member provided at the end of said lever and having a given number of teeth, said arm being interposed between said lock ring and said lever, and having automatic locking up means which said clamp member is constructed such that, after the said lever is turned by said arm in the locking direction to allow said teeth to bite into said webbing, said lever is allowed to turn in the locking direction only by unwinding force on said webbing, thereby locking up said webbing automatically.

3. A seat belt retractor including a reel shaft for winding a webbing on it, a frame for rotatably supporting both ends of said reel shaft, lock means that is located between said frame and said reel shaft, and permits the rotation of said reel shaft in the normal state and is actuated, as occasion demands, to lock said reel shaft against at least its rotation in the webbing unwinding direction, deceleration sensor means that is actuated when deceleration larger than a predetermined value is applied to a vehicle, lock actuator means that turns in synchronism with the rotation of said reel shaft in the normal state, and rotates relative to said reel shaft in operable association with the actuation of said deceleration sensor means, thereby actuating said lock means, clamp means for locking said webbing, and an operably member that operates in operable association with the actuation of said lock means to actuate said clamp means, characterized in that:

said lock means including a lock ring having a first portion to be engaged, said first portion being provided at one end of said reel shaft of said frame and designed to be rotatably by a given amount; a first engaging member having a first engaging portion that is rotatably supported at one end by one end of said reel shaft and can be engaged at the other end with said first portion to be engaged, said first engaging portion being designed such that, in the normal state, it is held at a position where it is not engaged with said first portion to be engaged and, as occasion demands, it turns to a position where it is engaged with said first portion to be engaged; a second portion to be engaged, that is provided at the other end of said reel shaft; and a second engaging member having a second engaging portion that is rotatably supported at one end by the other end of said reel shaft and can be engaged at the other end with said second portion to be engaged, said second engaging portion being designed such that, in the normal state, it is held at a position where it is not engaged with said second portion to be engaged and, as occasion demands, it turns to a position where it is engaged with said second portion to be engaged, said clamp means including a clamp member for having clamping force on said webbing and a member for bearing the clamping force of said clamp member, said webbing being clamped between said clamp member and said force bearing member under the clamping force of said clamp member, thereby locking up said webbing, said clamp member including a lever comprising a toggle link mechanism and a toothed member provided at the end of said lever and having a given number of teeth, and having automatic locking up means which said clamp member is constructed such that, after the said lever is turned in the locking direction to allow said teeth to bite into said webbing, said lever is allowed to turn in the locking direction only by unwinding force on said webbing, thereby locking up said webbing automatically, and said operable member comprising an arm that is engaged with said lock ring and said clamp member, thereby transmitting the rotational force of said reel shaft transmitted to said lock ring to said clamp member and turning said lever in the locking direction.

* * * * *